United States Patent
Carranza et al.

(10) Patent No.: US 11,046,908 B2
(45) Date of Patent: Jun. 29, 2021

(54) OXAZOLINE MODIFIED DISPERSANTS

(71) Applicant: Afton Chemical Corporation, Richmond, VA (US)

(72) Inventors: Arturo Carranza, Henrico, VA (US); Sheng Jiang, Glen Allen, VA (US); John Loper, Henrico, VA (US)

(73) Assignee: Afton Chemical Corporation, Richmond, VA (US)

( * ) Notice: Subject to any disclaimer, the term of this patent is extended or adjusted under 35 U.S.C. 154(b) by 257 days.

(21) Appl. No.: 16/246,030

(22) Filed: Jan. 11, 2019

(65) Prior Publication Data
US 2020/0224117 A1    Jul. 16, 2020

(51) Int. Cl.
| | | |
|---|---|---|
| *C10M 159/12* | (2006.01) | |
| *C08G 73/02* | (2006.01) | |
| *C08G 85/00* | (2006.01) | |
| *C10M 137/10* | (2006.01) | |
| *C10N 60/00* | (2006.01) | |

(52) U.S. Cl.
CPC ....... *C10M 159/12* (2013.01); *C08G 73/0206* (2013.01); *C08G 85/004* (2013.01); *C10M 137/10* (2013.01); *C10N 2060/09* (2020.05)

(58) Field of Classification Search
CPC ............. C08G 85/004; C08G 73/0206; C10M 159/12; C10M 137/10; C10M 133/56; C10M 2215/28; C10M 2215/086; C10M 2215/225; C10N 2260/09; C10N 2020/04; C10N 2040/25; C10N 2030/02; C10N 2030/06; C10N 2060/09; C10N 2030/041; C10N 2020/02
See application file for complete search history.

(56) References Cited

U.S. PATENT DOCUMENTS

| | | |
|---|---|---|
| 3,516,944 A | 6/1970 | Litt |
| 4,049,564 A | 9/1977 | Ryer et al. |
| 4,102,798 A | 7/1978 | Ryer et al. |
| 4,113,639 A | 9/1978 | Lonstrup et al. |
| 4,169,836 A | 10/1979 | Ryer et al. |
| 4,678,833 A | 7/1987 | McCreedy et al. |
| 4,702,854 A | 10/1987 | Snyder et al. |
| 4,831,161 A | 5/1989 | Wang et al. |
| 4,839,073 A | 6/1989 | Gutierrez et al. |
| 4,938,880 A | 7/1990 | Waddoups et al. |

(Continued)

FOREIGN PATENT DOCUMENTS

| | | |
|---|---|---|
| DE | 202006014282 | 12/2006 |
| DE | 102006059835 | 3/2008 |

(Continued)

OTHER PUBLICATIONS

European Search Report; dated Jun. 27, 2019 for EP Application No. 19158966.2.

(Continued)

*Primary Examiner* — Vishal V Vasisth
(74) *Attorney, Agent, or Firm* — Honigman LLP

(57) ABSTRACT

The present disclosure relates to oxazoline modified lubricant additives that have dispersant properties and lubricating oil compositions including such dispersant lubricant additives. The disclosure also relates to the use of lubricant compositions comprising the additives of the disclosure for improving the soot or sludge handling characteristics of an engine lubricant composition while providing robust and consistent frictional performance at the same time.

29 Claims, 2 Drawing Sheets

(56) References Cited

U.S. PATENT DOCUMENTS

| | | | |
|---|---|---|---|
| 5,049,290 A | 9/1991 | Emert et al. |
| 5,063,262 A | 11/1991 | Hildebrand |
| 5,075,383 A | 12/1991 | Migdal et al. |
| 5,085,788 A | 2/1992 | Emert et al. |
| 5,094,766 A | 3/1992 | Kapuscinksi |
| 5,139,688 A | 8/1992 | Nalesnik |
| 5,178,786 A | 1/1993 | Jahnke et al. |
| 5,306,313 A | 4/1994 | Emert et al. |
| 5,407,500 A | 4/1995 | Forsberg et al. |
| 6,107,257 A | 8/2000 | Valcho et al. |
| 6,172,015 B1 | 1/2001 | Emert |
| 6,878,799 B2 | 4/2005 | He |
| 7,214,653 B2 | 5/2007 | Yoneda et al. |
| 7,943,141 B2 | 5/2011 | Harris et al. |
| 8,158,748 B2 | 4/2012 | Dershem et al. |
| 8,883,211 B2 | 11/2014 | Bentley et al. |
| 8,927,469 B2 | 1/2015 | Mathur et al. |
| 9,284,411 B2 | 3/2016 | Bentley et al. |
| 9,944,755 B2 | 4/2018 | Yin et al. |
| 2004/0048753 A1 | 3/2004 | Ritchie |
| 2004/0259742 A1 | 12/2004 | Mishra |
| 2006/0173135 A1 | 3/2006 | Devlin et al. |
| 2008/0182768 A1 | 7/2008 | Devlin et al. |
| 2009/0192061 A1 | 7/2009 | Boegner et al. |
| 2009/0270531 A1 | 10/2009 | Ruhe, Jr. |
| 2010/0160192 A1 | 6/2010 | Ruhe, Jr. |
| 2012/0264665 A1 | 10/2012 | Wu et al. |
| 2014/0107001 A1 | 4/2014 | Saccomando |
| 2014/0187454 A1 | 7/2014 | Brewer |
| 2016/0024252 A1 | 1/2016 | Yin et al. |
| 2016/0152782 A1 | 6/2016 | Cammage et al. |
| 2017/0175600 A1 | 6/2017 | Douglass |
| 2017/0202971 A1 | 7/2017 | Yin et al. |
| 2017/0275551 A1 | 9/2017 | Woodward et al. |
| 2017/0275556 A1 | 9/2017 | Preston |
| 2018/0016515 A1 | 1/2018 | Lagona |
| 2018/0163153 A1 | 6/2018 | Cain et al. |
| 2018/0371357 A1 | 12/2018 | Knapton |
| 2019/0177651 A1 | 6/2019 | Loper et al. |
| 2019/0264126 A1 | 8/2019 | Jiang et al. |

FOREIGN PATENT DOCUMENTS

| | | |
|---|---|---|
| EP | 0338672 | 10/1989 |
| EP | 0552554 A1 | 7/1993 |
| EP | 1489281 | 12/2004 |
| EP | 1686141 | 8/2005 |
| EP | 2557144 | 2/2013 |
| GB | 1547980 A | 7/1979 |
| WO | 9309206 A1 | 5/1993 |
| WO | 2017192202 A1 | 11/2017 |

OTHER PUBLICATIONS

European Search Report; dated May 20, 2020 for EP Application No. 20151073.2.

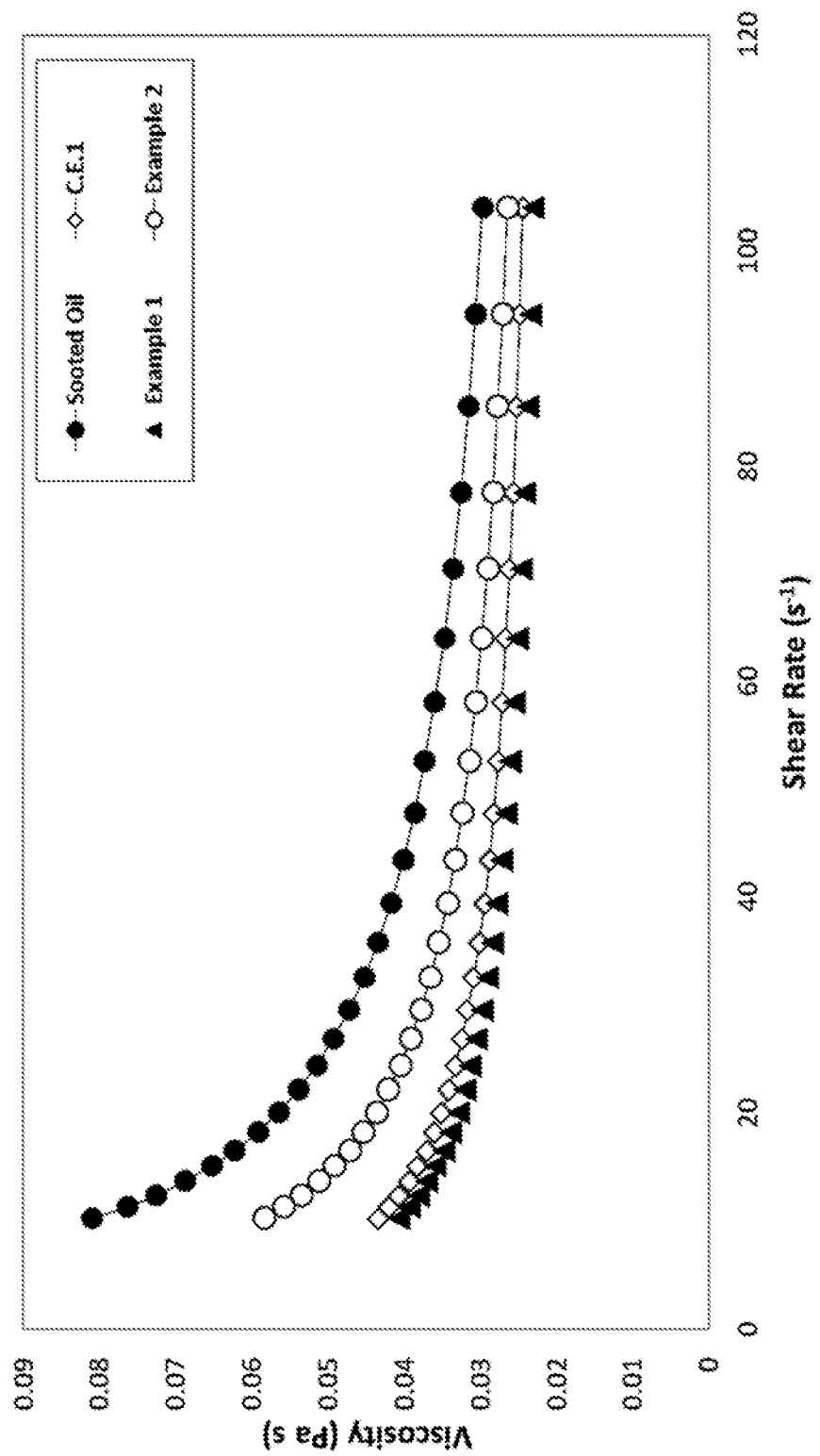

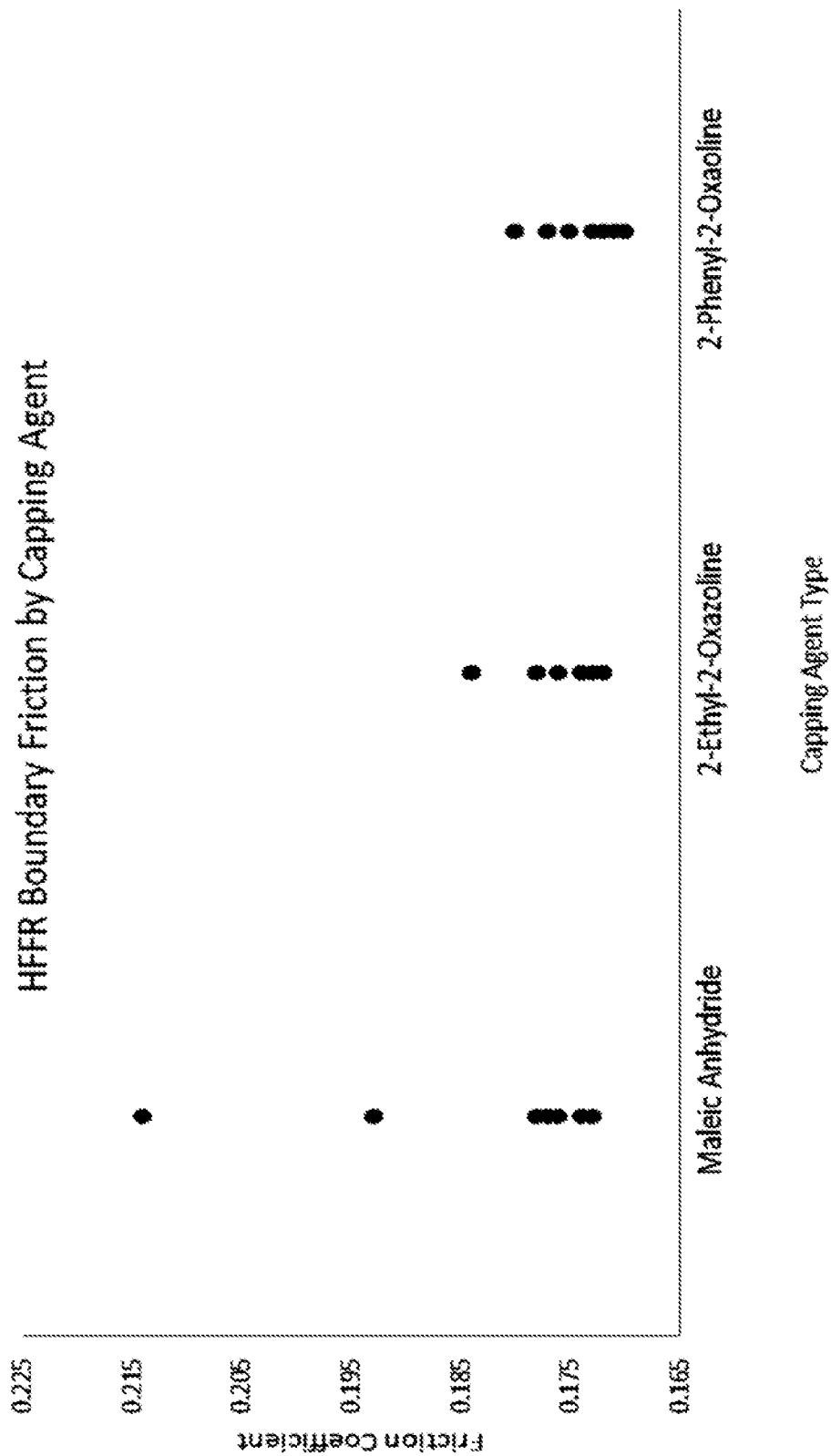

OXAZOLINE MODIFIED DISPERSANTS

TECHNICAL FIELD

The present disclosure relates to oxazoline modified lubricant additives, such as dispersants and/or dispersant viscosity modifiers, and lubricating oil compositions including such additives. The disclosure also relates to the methods or use of lubricant compositions comprising the additives herein for providing dispersancy while also improving the frictional performance of the lubricant.

BACKGROUND

Engine oils include many additives to provide various functionalities to the lubricant. Dispersants or dispersant viscosity modifiers are one additive of a formulated lubricant that help suspend deposit precursors, soot, sludge, or other contaminants that could deteriorate the lubricant's performance over time. In many instances, dispersants or dispersant viscosity modifiers contain nitrogen moieties that aid in dispersancy and/or to provide other functionalities such as anti-wear or viscosity modification. For example, typical dispersants include the reaction product of polyisobutylene with maleic anhydride to form a polyisobutylene succinic anhydride (PIBSA). The PIBSA is then reacted with various nitrogen-containing compounds to form the dispersant or dispersant viscosity modifier. Other common dispersants are formed by reacting an olefin copolymer with maleic anhydride to form an olefin copolymer succinic anhydride (such as an ethylene/propylene succinic anhydride or EPSA). This copolymer may also be reacted with various nitrogen compounds to form functionalized dispersants or dispersant viscosity modifiers. However, primary and/or secondary amines commonly used in the dispersant functionalization, in some instances, tend to be incompatible with engine elastomer seals and/or impact frictional performance of the lubricant. In the past, a variety of borates, anhydrides, and carboxylic acids have been used to attenuate the effects of unprotected amines, but use of such additional lubricant components tends to complicate lubrication formulations and are undesired.

BRIEF DESCRIPTION OF THE FIGURES

FIG. 1 is a graph showing the dispersant performance of example dispersants at about 0.665 weight percent in a lubricating oil; and FIG. 2 is a graph comparing the boundary friction of lubricants including dispersants with different types of nitrogen-capping agents.

SUMMARY

In one aspect, the present disclosure relates to a lubricant dispersant comprising a reaction product of a hydrocarbyl substituted succinamide or succinimide dispersant with an oxazoline or an oxazoline derivative to form a lubricant dispersant having one or more pendant hydrocarbyl amide groups. The hydrocarbyl substituted succinamide or succinimide dispersant is derived from a hydrocarbyl substituted acylating agent reacted with a polyalkylene polyamine. The hydrocarbyl substituent of the succinamide or the succinimide dispersant is a linear or branched hydrocarbyl group having a number average molecular weight of about 250 to about 5,000 as measured by GPC using polystyrene as a calibration reference.

In the foregoing embodiment, the oxazoline or the oxazoline derivative may include hydrocarbyl pendant groups in one of oxazoline ring positions 2, 4, 5, or combinations thereof. In any of the foregoing embodiments, the hydrocarbyl pendant groups may be selected from C1 to C32 hydrocarbyl, substituted or unsubstituted aromatic, substituted or unsubstituted hetrocyclic aromatic, hydroxyalkyl, and mixtures thereof. In any of the foregoing embodiments, the oxazoline or the oxazoline derivative may be selected from the group consisting of 2-ethyl-2-oxazoline; 2-methyl-2-oxazoline; 2-benzyl-4,4-dimethyl-2-oxazoline; 2-ethyl-4,4-dimethyl-2-oxazoline; 2,4,4-trimethyl-2-oxazoline; 4,4-dimethyl-2-oxazoline; 2-(2,6-dimethoxyphenyl)-4,4-dimethyl-2-oxazoline; 2-phenyl-2-oxazoline; 2-[1-(hydroxymethyl) ethyl]oxazoline; mixtures thereof, and derivatives thereof.

In any of the foregoing embodiments, the acylating agent may be selected from maleic anhydride, maleic acid, malic acid, tartaric acid, itaconic acid, itaconic anhydride, citraconic acid, citraconic anhydride, mesaconic acid, ethylmaleic anhydride, dimethylmaleic anhydride, methylmaleic acid, dimethylmaleic acid, hexylmaleic acid, and combinations thereof.

In any of the foregoing embodiments, the one or more pendant hydrocarbyl amide groups extend from amine moieties provided by the polyalkylene polyamine. In any of the foregoing embodiments, the amine moieties may be primary amine moieties, secondary amines moieties, or combinations thereof. In any of the foregoing embodiments, the dispersant may include a molar ratio of the oxazoline or the oxazoline derivative to the amine moieties provided from the polyalkylene polyamine reactant of about 0.33:1 to about 6:1 molar equivalents.

In any of the foregoing embodiments, the hydrocarbyl substituent may be derived from one or more of ethylene, propylene, isopropylene, butylene, isobutylene, octane, hexane, decene, pentylene, isopentylene, neopentylene, and combinations thereof. In any of the foregoing embodiments, the hydrocarbyl substituent may be derived from an olefin copolymer. In any of the foregoing embodiments, the olefin copolymer may be obtained from ethylene and one or more C3 to C10 alpha olefins. In any of the foregoing embodiments, the hydrocarbyl substituent of the succinamide or the succinimide may be the linear or branched hydrocarbyl group having a number average molecular weight of about 250 to about 3,000 as measured by GPC using polystyrene as a calibration reference. In any of the foregoing embodiments, the polyalkylene polyamine may have the formula

wherein each R and R', independently, is a divalent C1 to C6 alkylene linker and each $R_1$ and $R_2$, independently, is hydrogen, a C1 to C6 alkyl group, or together with the nitrogen atom to which they are attached form a 5- or 6-membered ring optionally fused with one or more aromatic or non-aromatic rings; and n is an integer from 0 to 8. In any of the foregoing embodiments, the polyalkylene polyamine may be selected from the group consisting of a mixture of polyethylene polyamines having an average of 5 to 7 nitrogen atoms, triethylenetetramine, tetraethylenepentaamine, and combinations thereof. In any of the foregoing embodiments, the reaction product may be the hydrocarbyl-substituted succinimide and may have a ratio of pendant amide groups to imide groups of about 0.5:1 to about 5:1.

In another aspect, the present disclosure relates to a lubricant composition comprising a base oil of lubricating viscosity and a dispersant derived from a hydrocarbyl substituted succinamide or succinimide reacted with an oxazoline or an oxazoline derivative and wherein the dispersant has one or more pendant hydrocarbyl amide groups extending from amine moieties thereof. The hydrocarbyl substituted succinamide or succinimide is derived from a hydrocarbyl substituted succinic anhydride or acid reacted with a polyalkylene polyamine providing the one or more amine moieties. The hydrocarbyl substituent of the succinamide or succinimide is a linear or branched hydrocarbyl group having a number average molecular weight of about 250 to about 5,000 as measured by GPC using polystyrene as a calibration reference.

In any of the foregoing embodiments, the oxazoline or the oxazoline derivative may include hydrocarbyl pendant groups in one of oxazoline ring positions 2, 4, 5 or combinations thereof. In any of the foregoing embodiments, the hydrocarbyl pendant groups may be selected from C1 to C32 hydrocarbyl, substituted or unsubstituted aromatic, substituted or unsubstituted hetrocyclic aromatic, hydroxyalkyl, and mixtures thereof. In any of the foregoing embodiments, the oxazoline or the oxazoline derivative may be selected from the group consisting of 2-ethyl-2-oxazoline; 2-methyl-2-oxazoline; 2-benzyl-4,4-dimethyl-2-oxazoline; 2-ethyl-4, 4-dimethyl-2-oxazoline; 2,4,4-trimethyl-2-oxazoline; 4,4-dimethyl-2-oxazoline; 2-(2,6-dimethoxyphenyl)-4,4-dimethyl-2-oxazoline; 2-phenyl-2-oxazoline; 2-[1-(hydroxymethyl) ethyl]oxazoline; mixtures thereof, and derivatives thereof.

In any of the foregoing embodiments, the hydrocarbyl substituted succinic anhydride or acid may be a hydrocarbyl-substituted maleic anhydride, maleic acid, malic acid, tartaric acid, itaconic acid, itaconic anhydride, citraconic acid, citraconic anhydride, mesaconic acid, ethylmaleic anhydride, dimethylmaleic anhydride, methylmaleic acid, dimethylmaleic acid, hexylmaleic acid, or combinations thereof. In any of the foregoing embodiments, the amine moieties provided by the polyalkylene polyamine may be selected from one of primary amines, secondary amines, or combinations thereof. In any of the foregoing embodiments, the dispersant may further comprise a molar ratio of the oxazoline or the oxazoline derivative to the amine moieties provided by the polyalkylene polyamine reactant of about 0.33:1 to about 6:1 molar equivalents.

In any of the foregoing embodiments, the hydrocarbyl substituent may be a linear or branched hydrocarbyl group having a number average molecular weight of about 250 to about 3,000 as measured by GPC using polystyrene as a calibration reference. In any of the foregoing embodiments, the polyalkylene polyamine may have the formula

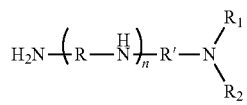

wherein each R and R', independently, is a divalent C1 to C6 alkylene linker and each $R_1$ and $R_2$, independently, is hydrogen, a C1 to C6 alkyl group, or together with the nitrogen atom to which they are attached form a 5- or 6-membered ring optionally fused with one or more aromatic or non-aromatic rings; and n is an integer from 0 to 8. In any of the foregoing embodiments, the polyalkylene polyamine may be selected from the group consisting of a mixture of polyethylene polyamines having an average of 5 to 7 nitrogen atoms, triethylenetetramine, tetraethylenepentaamine, and combinations thereof. In any of the foregoing embodiments, the dispersant may be the hydrocarbyl-substituted succinimide and may have a ratio of pendant amide groups to imide groups of 0.5:1 to 5:1. In any of the foregoing embodiments, the hydrocarbyl substituent of the dispersant may be derived from one or more of ethylene, propylene, isopropylene, butylene, isobutylene, octane, hexane, decene, pentylene, isopentylene, neopentylene, or combinations thereof. In any of the foregoing embodiments, the hydrocarbyl substituent of the dispersant may be derived from an olefin copolymer. In any of the foregoing embodiments, the olefin copolymer may be obtained from ethylene and one or more C3 to C10 alpha olefins.

In another aspect, the present disclosure relates to methods of using or the use of any embodiment of the lubricant additive or the lubricant composition above to provide dispersancy and to provide a robust and consistent boundary friction. In any embodiment, the method or use may provide robust and consistent boundary friction independent of additive treat rate, oxazoline capping agent, and/or molar equivalencies of the ozazoline moiety to the amine moieties.

DETAILED DESCRIPTION

Lubricant additives and lubricating oil compositions including such additives are described herein. In one approach, the lubricant additives may include dispersants or dispersant viscosity modifiers that are post-treated with an oxazoline moiety to provide good dispersancy and, at the same time, to provide improved and consistent frictional performance. In one approach or embodiment, the dispersants or dispersant viscosity modifiers herein may be succinamide or succinimide compounds or polymers reacted or post-treated with an oxazoline or an oxazoline derivative to form the inventive lubricant additives that include one or more pendant or side chain hydrocarbyl amide groups. This post-treatment may be applicable to dispersant additives, dispersant viscosity modifier additives, and the like depending on a desired application or use. For ease in discussion, a dispersant additive will be used throughout this disclosure for simplicity, but such discussion also applies to dispersant viscosity modifier additives, dispersant viscosity index improvers, or other nitrogen or amine functionalized additives that may require more robust frictional performance together with the additive's dispersant functionality.

As noted in the background, lubricants or engine oils commonly include many additives. Dispersants are common additives in engine oil for dispersing sludge, carbon, soot, oxidation products, and other deposit precursors. Such additives aid in keeping engine parts clean, prolonging engine life, and helping to maintain proper emissions and good fuel economy. In some approaches, dispersants accomplish this task by inhibiting particle-to-particle aggregation. Accordingly, the soot and sludge handling properties of the lubricant are often improved as the amount of dispersant in the lubricant composition is increased, but increasing the amount of those additives can, in some instances, adversely affect other properties of the fluid. Described herein, on the other hand, are lubricant additives with dispersant properties, and lubricating oils including such additives that have one or more of the following: comparable (or better) dispersant properties, improved frictional characteristics and, at the same time, a more robust or consistent frictional performance independent of treat rate, the type of amine post-treating moiety, and/or molar equivalencies between the amine post treatment moiety and the primary/secondary amines of the dispersant.

Lubricant additives, such as dispersants or multi-functional dispersant viscosity modifiers, are described herein that provide dispersancy (and/or dispersant viscosity modification) and also provide robust and/or consistent frictional performance. In one aspect, the lubricant additive is a reaction product of a hydrocarbyl substituted succinamide or succinimide dispersant with an oxazoline or an oxazoline derivative to form a lubricant dispersant having one or more pendant hydrocarbyl amide groups capping primary and/or secondary amines on the dispersant molecule. The hydrocarbyl substituted succinamide or succinimide dispersant is derived from a hydrocarbyl substituted acylating agent reacted with a polyalkylene polyamine. The hydrocarbyl substituent of the succinamide or the succinimide dispersant is a linear or branched hydrocarbyl group having a number average molecular weight of about 250 to about 5,000 as measured by GPC using polystyrene as a calibration reference (in other approaches, about 250 to about 3,000). In some embodiments, the linear or branched hydrocarbyl group is derived from one or more of ethylene, propylene, isopropylene, butylene, isobutylene, octane, hexane, decene, pentylene, isopentylene, neopentylene, and combinations thereof or, in other embodiments, the linear or branched hydrocarbyl group is an olefin copolymer obtained from the olefin ethylene and one or more C3 to C10 alpha olefins. The oxazoline or oxazoline derivatives cap (or bond with) primary and/or secondary nitrogen or amine groups on the succinamide or succinimide dispersant. The oxazoline capped dispersants or dispersant viscosity modifiers herein provide a robust and consistent frictional performance.

Disclosed herein are also methods or the use of oxazolines or oxazoline derivatives as a chemical modification to lubricant additives that unexpectedly provide more robust frictional performance along with the dispersant performance of the additive. The present disclosure provides a method of capping exposed primary and/or secondary amines through a post-treatment reaction with oxazolines or oxazoline derivatives. It has also been demonstrated that while capping amines with certain oxazolines, an unexpected dispersancy boost and improved frictional performance at low treat rate performance is also achievable in some applications. A wide variety of oxazoline derivatives are compatible with the present disclosure, as described below. Each component will be described further below starting with the oxazoline post-treatment component, then the dispersant molecule, and finally the amine functionalization component.

Oxazoline Post Treatment:

In one aspect, the lubricant additives herein are post treated or reacted with an oxazoline-derived capping agent such as an oxazoline or derivative thereof of Formula I

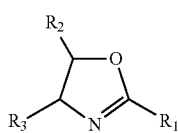

(Formula I)

wherein $R_1$ to $R_3$ are each independently selected from the group consisting of hydrogen, halo, nitro, cyano, a $C_1$ to $C_{32}$ aliphatic group, phenyl, naphthyl, a 3-7 membered heterocyclic group, a 5-6 membered heteroaryl group, and wherein up to 5 carbons of said $C_1$ to $C_{32}$ aliphatic group may be independently and optionally replaced with a bivalent group selected from —O—, —NH—, —N($C_{1-4}$ alkyl)-, —C(O)—, —C(O)O—, —C(O)NH—, or —C(O)N($C_{14}$ alkyl)-. In some embodiments or approaches, each $R_1$ to $R_3$ may be independently and optionally substituted with up to three substituents selected from $C_1$ to $C_6$ alkyl, phenyl, naphthyl, a 3-7 membered heterocyclic group, a 5-6 membered heteroaryl group, halo, nitro, and cyano. In other aspects, $R_2$ is hydrogen, halo, or a $C_{1-4}$ alkyl.

In another embodiment, $R_1$ is selected from the group consisting of halo, nitro, cyano, methyl, ethyl, propyl, isopropyl, butyl, isobutyl, sec-butyl, tert-butyl, n-pentyl, n-heptyl, 2-ethylhexyl, phenyl, furyl, thiophenyl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, and 1,3,5-triazyl, optionally substituted with up to three substituents selected from $C_1$ to $C_6$ alkyl, phenyl, halo, nitro, and cyano.

In some approaches, $R_1$ is ethyl or phenyl, or $R_1$ may be hydrogen. In other approaches, $R_2$ is hydrogen. In some other embodiments, $R_3$ is hydrogen. In some further embodiments, $R_3$ and $R_2$ are both hydrogen. In one further embodiment, $R_1$ is ethyl or phenyl and $R_3$ and $R_2$ are both hydrogen.

In other approaches or embodiments, the oxazoline or derivative thereof suitable for a capping agent herein may be selected from the group consisting of 2-phenyl-2-oxazoline; 2-ethyl-2 oxazoline; 2-methyl-2-oxazoline; 2-benzyl-4,4-dimethyl-2-oxazoline; 2-ethyl-4,4-dimethyl-2 oxazoline; 2,4,4-trimethyl-2-oxazoline; 4,4-dimethyl-2-oxazoline; dimethoxyphenyl)-4,4-dimethyl-2-oxazoline; 2-[1-(hydroxymethyl)ethyl]oxazoline; mixtures thereof, and derivatives thereof. In yet other approaches or embodiments, the oxazoline or derivative thereof includes pendant groups in positions 2, 4, or 5 (or any combination thereof) wherein the pendant groups are selected from heterocyclic, aromatics, hydrocarbyl groups of $C_1$ to $C_{32}$, and mixtures thereof.

In some optional approaches, the lubricant additives herein may have a capping ratio of about 5 to about 100 percent of the primary and/or secondary amines, in other approaches, about 5 to about 70 percent, about 5 to about 50 percent, and in yet further approaches, about 7 to about 35 percent capping. In these optional approaches, the capping ratio may range from at least about 5 percent, at least about 10 percent, at least about 20 percent, at least about 30 percent, at least about 40 percent, or at least about 50 percent and no more than about 100 percent, no more than about 90 percent, no more than about 80 percent, nor more than about 70 percent, or no more than about 60 percent. As used herein, the optional capping ratio is the percent of primary or secondary amines that have been capped or post-treated with at least the oxazoline or derivative thereof. In some approaches, a molar ratio of the oxazoline or derivative thereof to the active amines (that is primary and/or secondary amines) is about 9:1 to about 0.33:1, in other approaches, about 0.33:1 to about 6:1, in other approaches, about 3:1 to about 1:1; and in yet further approaches, about 3:1 to about 1.5:1. In further approaches, a molar ratio of the oxazoline or derivative thereof to active amines is about 1:1. Percent capping in the optional approaches is determined by measuring the nitrogen concentration (primary or secondary amines) of the additive before and after the capping reaction using known nitrogen measurement techniques.

In some approaches, the reaction product as described herein is the hydrocarbyl-substituted succinimide and, when capped with the oxazoline or oxazoline derivative of Formula I above, has a ratio of percent amide groups to imide groups of about 0.5:1 to about 5:1.

Hydrocarbyl Substituted Succinamide or Succinimide Dispersant:

The hydrocarbyl-substituted succinamide or succinimide of the present disclosure is derived from a hydrocarbyl-substituted acylating agent reacted with a polyalkylene polyamine. The hydrocarbyl substituent of the succinimide or the succinamide is a linear or branched hydrocarbyl group having a number average molecular weight of about 250 to about 10,000 as measured by GPC using polystyrene as a calibration reference. As discussed in more detail below, the linear or branched hydrocarbyl group may be derived from, for example, polyisobutylene (or other olefins) or an olefin copolymer obtained from the olefin ethylene and one or more C3 to C10 alpha olefins. In one approach, the hydrocarbyl-substituted polycarboxylic acid compound is a hydrocarbyl-substituted dicarboxylic acid or anhydride thereof such as succinic acid or succinic anhydride. In other approaches or embodiments, the dispersant is a hydrocarbyl-substituted succinimide, a hydrocarbyl-substituted succinamide, or combinations thereof. As used herein the term "succinimide" or "succinamide" is meant to encompass the reaction product between a polyalkylene polyamine and a polycarboxylic acid, such as a hydrocarbyl-substituted succinic acid or anhydride (or like succinic acylating agent), and includes compounds wherein the reaction product may have amide, and/or salt linkages in addition to the imide linkage of the type that results from the reaction of or contact with the polyamine, and the acid or anhydride moiety.

In one embodiment, the hydrocarbyl-substituted polycarboxylic acid or anhydride can be made by first reacting the double bond on the terminal end group of the hydrocarbyl group with an acylating agent (e.g., maleic acid or maleic anhydride) via thermal ene reaction and/or halogenation-condensation, to form a hydrocarbyl-substituted succinic acid or anhydride, see, e.g., U.S. Pat. Nos. 7,897,696, 3,361,673 and 3,676,089, which are incorporated herein by reference. Alternatively, the hydrocarbyl-substituted polycarboxylic acid or anhydride (such as hydrocarbyl-substituted succinic anhydrides) can be prepared by the reaction of chlorinated polyolefins with maleic anhydride, as described, for example, in U.S. Pat. No. 3,172,892, the disclosure of which is also incorporated by reference. A further discussion of hydrocarbyl-substituted succinic anhydrides can be found, for example, in U.S. Pat. Nos. 4,234,435; 5,620,486 and 5,393,309, the disclosures of which are incorporated by reference. Reaction temperatures used to form the hydrocarbyl-substituted succinic acid or anhydride range from about 100° C. to about 250° C. This reaction is often promoted by the addition of chlorine. Alkenyl succinimides or succinamides in which the succinic group contains a hydrocarbyl substituent containing at least 4 carbon atoms may be useful in the present disclosure and are described for example in U.S. Pat. Nos. 3,172,892; 3,202,678; 3,216,936; 3,219,666; 3,254,025; 3,272,746; 4,234,435; 4,613,341; and 5,575,823, the disclosures of all of which are hereby incorporated by reference.

In the hydrocarbyl-substituted polycarboxylic acid or anhydride, such as an alkenyl succinic acid or anhydride, the ratio of succinic moiety:hydrocarbyl backbone is about 0.8:1 to about 2:1, or about 1:1 to about 1.8:1, or about 1.2:1 to about 1.5:1.

The acylating agent of the above process is an unsaturated substituted or unsubstituted organic acid or anhydride, for example maleic or fumaric reactants of the general formula:

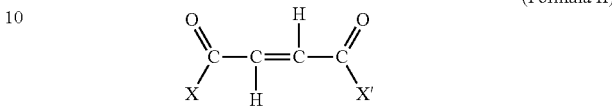

(Formula II)

wherein X and X' are the same or different, provided that at least one of X and X' is a group that is capable of reacting to esterify alcohols, forming amides or amine salts with ammonia or amines, forming metal salts with reactive metals or basically reacting metal compounds, or otherwise functioning as an acylating agent. Typically, X and/or X' is —OH, —O-hydrocarbyl, —NH$_2$, and taken together X and X' can be —O— so as to form an anhydride. In some embodiments, X and X' are such that both carboxylic functions can enter into acylation reactions.

Maleic anhydride is a suitable acylating agent. Other suitable acylating agents include electron-deficient olefins such as monophenyl maleic anhydride; monomethyl maleic anhydride, dimethyl maleic anhydride, N-phenyl maleimide and other substituted maleimides; isomaleimides; fumaric acid, maleic acid, alkyl hydrogen maleates and fumarates, dialkyl fumarates and maleates, fumaronilic acids and maleanic acids; and maleonitrile and fumaronitrile.

In some approaches, a mole ratio of maleic anhydride (or other acylating agent) to the olefinic unsaturated hydrocarbon or polyolefin can vary widely. For example, and in some approaches, it can vary from about 6:1 to about 1:6, or from about 5:1 to about 1:5, or from about 3:1 to about 1:3, and in yet other approaches, the maleic anhydride can be used in stoichiometric excess to force the reaction to completion. If needed, the unreacted maleic anhydride can be removed by vacuum distillation.

The hydrocarbyl substituent may include olefins such as, but are not limited to, linear alpha olefins, branched chain alpha olefins, polymers and copolymers of lower olefins. The olefins can be chosen from ethylene, propylene, isopropylene, butylene, such as isobutylene, 1-octene, 1-hexene, 1-decene, n-pentylene, isopentylene, and/or neopentylene and the like. Some useful polymers and/or copolymers of lower olefins include, but are not limited to, polypropylene, polybutenes, polyisobutene, ethylene-propylene copolymers, ethylene-isobutylene copolymers, propylene-isobutylene copolymers, ethylene-1-decene copolymers and the like.

Hydrocarbyl substituents have also been made from olefin terpolymers. Useful products can be made from ethylene-C$_{3-12}$ alpha olefin-C$_{5-12}$ non-conjugated diene terpolymers; such as ethylene-propylene-1,4-hexadiene terpolymer; ethylenepropylene-1,5-cyclooctadiene terpolymer; ethylene-propylenenorbornene terpolymers and the like.

In one approach or embodiment, the hydrocarbyl substituents may be derived from butene polymers, for example polymers of isobutylene. Suitable polyisobutenes for use in preparing the polycarboxylic acids or anhydrides of the present disclosure can in some embodiments include those polyisobutenes that comprise at least about 20% of the more reactive methylvinylidene isomer, for example at least 50%, and as a further example at least 70%. Suitable polyisobutenes include those prepared using BF3 catalysts. The preparation of such polyisobutenes in which the methylvinylidene isomer comprises a high percentage of the total composition is described in U.S. Pat. Nos. 4,152,499 and 4,605,808, the disclosures of which are hereby incorporated by reference.

In another embodiment, the hydrocarbyl substituent is derived from an olefin copolymer derived from ethylene and one or more $C_3$ to $C_{10}$ alpha-olefins. The one or more $C_3$ to $C_{10}$ alpha-olefins may be for example $C_3$ or $C_4$ carbon atoms. Copolymers of ethylene and propylene or ethylene and butylene are possible.

More complex polymer substrates, often designated as interpolymers, may be prepared using at least three monomers. For example, the monomer may be ethylene, propylene, and the third monomer generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of this disclosure are 1-isopropylidene-3a,4,7,7a-tetrahydroindene, 1-isopropylidene dicyclopentadiene, dihydro-isodicyclopentadiene, and 2-(2-methylene-4-methyl-3-pentenyl) [2.2.1] bicyclo-5-heptene.

Ethylene-propylene or higher alpha-olefin copolymers may consist of from about 15 to 80 mole percent ethylene and from about 85 to 20 mole percent $C_3$ to $C_{10}$ alpha-olefin with the preferred mole ratios being from about 35 to 75 mole percent ethylene and from about 65 to 25 mole percent of a $C_3$ to $C_{10}$ alpha-olefin, with the more preferred proportions being from 50 to 70 mole percent ethylene and 50 to 30 mole percent $C_3$ to $C_{10}$ alpha-olefin, and the most preferred proportions being from 55 to 65 mole percent ethylene and 45 to 35 mole percent $C_3$ to $C_{10}$ alpha-olefin.

Terpolymer variations of the foregoing polymers may contain from about 0.1 to 10 mole percent of a non-conjugated diene or triene.

In some approaches, the terms polymer and copolymer are used generically to encompass ethylene copolymers, terpolymers or interpolymers. These materials may contain minor amounts of other olefinic monomers so long as the basic characteristics of the ethylene copolymers are not materially changed.

In some approaches or embodiments, the number average molecular weight of the hydrocarbyl substituent may be about 250 to about 10,000; in other approaches, about 250 to about 5,000; in other approaches, about 300 to about 5,000; in other approaches, about 300 to about 3,000; in other approaches, about 300 to about 2,500; in other approaches, about 750 to about 2,500; and in other approaches, about 600 to about 1,500; and in further approaches, about 600 to about 1,300; or about 1,300 to about 2,700 as determined by gel permeation chromatography (GPC) using polystyrene as a calibration reference. In yet other approaches, the number average molecular weight of the hydrocarbyl substituent may range from at least about 250, at least about 300, at least about 600, at least about 900, or at least about 1,000 and no more than 5,000; no more than 4,000; no more than about 3,000; no more than about 2,500; no more than about 1,500; or no more than about 1,000.

The number average molecular weight (Mn) for any embodiment herein may be determined with a gel permeation chromatography (GPC) instrument obtained from Waters or the like instrument and the data processed with Waters Empower Software or the like software. The GPC instrument may be equipped with a Waters Separations Module and Waters Refractive Index detector (or the like optional equipment). The GPC operating conditions may include a guard column, 4 Agilent PLgel columns (length of 300×7.5 mm; particle size of 5µ, and pore size ranging from 100-10000 Å) with the column temperature at about 40° C. Un-stabilized HPLC grade tetrahydrofuran (THF) may be used as solvent, at a flow rate of 1.0 mL/min. The GPC instrument may be calibrated with commercially available polystyrene (PS) standards having a narrow molecular weight distribution ranging from 500-380,000 g/mol. The calibration curve can be extrapolated for samples having a mass less than 500 g/mol. Samples and PS standards can be in dissolved in THF and prepared at concentration of 0.1 to 0.5 wt. % and used without filtration. GPC measurements are also described in U.S. Pat. No. 5,266,223, which is incorporated herein by reference. The GPC method additionally provides molecular weight distribution information; see, for example, W. W. Yau, J. J. Kirkland and D. D. Bly, "Modern Size Exclusion Liquid Chromatography", John Wiley and Sons, New York, 1979, also incorporated herein by reference.

Nitrogen or Amine Functionalization:

The hydrocarbyl-substituted polycarboxylic acid or anhydrides described above are nitrogen or amine-functionalized (and then post treated with the oxazoline or oxazoline derivatives as also described above). In one approach or embodiment, the lubricant additive may be a dispersant or dispersant viscosity modifier such as an amine functionalized hydrocarbyl-substituted polycarboxylic acid or anhydride (e.g., a hydrocarbyl-substituted succinimide or hydrocarbyl succinimide).

In one approach or embodiment, the hydrocarbyl-substituted polycarboxylic acid or anhydride is functionalized with a polyalkylene polyamine, such as the amine-containing polyalkylene polyamine of the Formula III below:

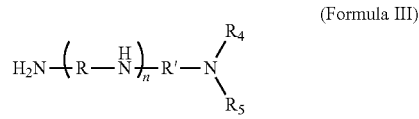

(Formula III)

wherein each R and R', independently, is a divalent $C_1$ to $C_6$ alkylene linker; each $R_4$ and $R_5$, independently, is hydrogen, a $C_1$ to $C_6$ alkyl group, or together with the nitrogen atom to which they are attached form a 5- or 6-membered ring optionally fused with one or more aromatic or non-aromatic rings, and n is an integer from 0 to 8.

Amine-functionalization of the hydrocarbyl-substituted polycarboxylic acid or anhydride is well-known in the art and may be accomplished through reacting the hydrocarbyl-substituted polycarboxylic acid or anhydride with a nitrogen source, such as a polyamine having at least one basic nitrogen. Conversion of an alkenyl succinic acid or anhydride into a succinimide is described in U.S. Pat. Nos.

3,215,707 and 4,234,435, both of which are incorporated herein by reference. Suitable nitrogen sources include polyamines, polyalkylene polyamines, and mixtures thereof. The polyalkylene polyamines may include mixtures of polyethylene polyamines having an average of 5 to 7 nitrogen atoms, triethylene tetramine (TETA), tetraethylene pentamine (TEPA), and combinations thereof.

In other approaches, non-limiting exemplary polyamines may include ethylene diamine, propane diamine, butane diamine, diethylene triamine (DETA), triethylene tetramine (TETA), pentaethylene hexamine (PEHA), aminoethyl piperazine, tetraethylene pentamine (TEPA), N-methyl-1,3-propane diamine, N,N'-dimethyl-1,3-propane diamine, aminoguanidine bicarbonate (AGBC), and heavy polyamines such as E100 heavy amine bottoms. A heavy polyamine may comprise a mixture of polyalkylenepolyamines having small amounts of lower polyamine oligomers such as TEPA and PEHA, but primarily oligomers having an average of 5 or more nitrogen atoms, in other approaches, an average of seven or more nitrogen atoms (and in yet other approaches, an average of 5 to 7 nitrogen atoms), two or more primary amines per molecule, and more extensive branching than conventional polyamine mixtures. Additional non-limiting polyamines which may be used to prepare the hydrocarbyl-substituted succinimide dispersant are disclosed in U.S. Pat. No. 6,548,458, the disclosure of which is incorporated herein by reference in its entirely. In some approaches, the polyamines used in the reactions to form the dispersants are selected from the group of triethylene tetramine, tetraethylene pentamine, E100 heavy amine bottoms, and combinations thereof. In one embodiment, the polyamine may be tetraethylene pentamine (TEPA).

The reaction between the hydrocarbyl-substituted polycarboxylic acid or anhydride and the alkylene polyamine to form the dispersant can, in one embodiment, be carried out by mixing the components and heating the mixture to a temperature high enough to cause a reaction to occur but not so high as to cause decomposition of the reactants or products or the anhydride may be heated to reaction temperature and the polyamine added over an extended period. A useful temperature is about 100° C. to about 250° C. Exemplary results can be obtained by conducting the reaction at a temperature high enough to distill out water formed in the reaction.

In one embodiment, the amine contains one or more primary or secondary amino groups. In some cases, the polyalkylene polyamines may have at least three nitrogen atoms and about 4 to 20 carbon atoms. One or more oxygen atoms may also be present in the polyamine. Several polyamines can be used in preparing the dispersant. In addition to the nitrogen sources mentioned above, non-limiting exemplary polyamines may include aminoguanidine bicarbonate (AGBC), ethylene diamine (EDA), N-methyl propylene diamine, diethylene triamine (DETA), pentaethylene hexamine (PEHA), or other heavy polyamines. Some heavy polyamines may comprise a mixture of polyalkylene polyamines having small amounts of lower polyamine oligomers such as TEPA and PEHA, having but primarily polyamine oligomers having seven or more nitrogen atoms, two or more primary amines per molecule, and more extensive branching than conventional polyamine mixtures. Additional non-limiting polyamines which may be used to prepare the dispersant are disclosed in U.S. Pat. No. 6,548,458, the disclosure of which is incorporated herein by reference in its entirety.

Other examples of suitable polyalkylene polyamines include, but are not limited to, propylene diamine, isopropylene diamine, butylene diamine, pentylene diamine, hexylene diamine, dipropylene triamine, dimethylaminopropyl amine, diisopropylene triamine, dibutylene triamine, di-sec-butylene triamine, tripropylene tetraamine, triisobutylene tetraamine, pentaethylene hexamine, and mixtures thereof.

A particularly suitable group of polyalkylene polyamines may contain from about 2 to about 12 nitrogen atoms and from about 2 to about 24 carbon atoms. The alkylene groups of such polyalkylene polyamines may contain from about 2 to about 6 carbon atoms, more preferably from about 2 to about 4 carbon atoms. Many of the polyamines suitable for use in the present disclosure are commercially available and others may be prepared by methods which are well known in the art. For example, methods for preparing amines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed., 1957; and Kirk-Othmer's "Encyclopedia of Chemical Technology", 2nd Ed., especially Volume 2, pp. 99-116, each of which is incorporated herein by reference.

Additional amines that can be used in forming the dispersant include an alkanolamine containing one or more hydroxy groups such as 2-(2-aminoethylamino) ethanol, aminoalkyl substituted heterocyclic compounds such as 1-(3-aminopropyl)imidazole and 4-(3-aminopropyl) morpholine, condensates of polyamines with polyhydroxy compounds such as condensates of polyethylene polyamines with tris(hydroxymethyl)aminomethane as described in U.S. Pat. No. 5,653,152, or mixtures thereof.

The reaction of the nitrogen source, such as polyamine and the hydrocarbyl-substituted polycarboxylic acid or anhydride affords mono-succinimide, bis-succinimide, tris-succinimide, or other succinimides depending on the charge ratio of the nitrogen source and the hydrocarbyl-substituted polycarboxylic acid or anhydride. The charge ratio between the hydrocarbyl-substituted polycarboxylic acid or anhydride and nitrogen source is about 1:1 to about 3.2:1, or about 2.5:1 to about 3:1, or about 2.9:1 to about 3:1, or about 1.6:1 to about 2.5:1, or about 1.6:1 to about 2:1, or about 1.6:1 to about 1.8:1, about 1.3:1 to about 1.8:1, about 1.4:1 to about 1.8:1, or about 1:6 to about 1.8:1.

Definitions

For purposes of this disclosure, the chemical elements are identified in accordance with the Periodic Table of the Elements, CAS version, Handbook of Chemistry and Physics, 75th Ed. Additionally, general principles of organic chemistry are described in "Organic Chemistry", Thomas Sorrell, University Science Books, Sausolito: 1999, and "March's Advanced Organic Chemistry", 5th Ed., Ed.: Smith, M. B. and March, J., John Wiley & Sons, New York: 2001, the entire contents of which are hereby incorporated by reference.

As used herein, the term "effective concentration" refers to the concentration of the dispersant necessary for a sooted base oil to show Newtonian behavior, which indicates that the soot particles in the base oil are sufficiently dispersed.

As used herein, the term "olefin copolymer" refers to a random and/or block polymer comprised of two or more different types of monomers, wherein all monomers contain at least one olefin (carbon-carbon double bond).

As described herein, compounds may optionally be substituted with one or more substituents, such as are illustrated generally above, or as exemplified by particular classes, subclasses, and species of the disclosure.

As used herein, the term "major amount" is understood to mean an amount greater than or equal to 50 weight percent, for example, from about 80 to about 98 weight percent relative to the total weight of the composition. Moreover, as used herein, the term "minor amount" is understood to mean an amount less than 50 weight percent relative to the total weight of the composition.

As used herein, the term "hydrocarbyl group" or "hydrocarbyl" is used in its ordinary sense, which is well-known to those skilled in the art. Specifically, it refers to a group having a carbon atom directly attached to the remainder of a molecule and having a predominantly hydrocarbon character. Examples of hydrocarbyl groups include: (1) hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form an alicyclic radical); (2) substituted hydrocarbon substituents, that is, substituents containing non-hydrocarbon groups which, in the context of the description herein, do not alter the predominantly hydrocarbon substituent (e.g., halo (especially chloro and fluoro), hydroxy, alkoxy, mercapto, alkylmercapto, nitro, nitroso, amino, alkylamino, and sulfoxy); (3) hetero-substituents, that is, substituents which, while having a predominantly hydrocarbon character, in the context of this description, contain other than carbon in a ring or chain otherwise composed of carbon atoms. Hetero-atoms include sulfur, oxygen, nitrogen, and encompass substituents such as pyridyl, furyl, thienyl, and imidazolyl. In general, no more than two, or as a further example, no more than one, non-hydrocarbon substituent will be present for every ten carbon atoms in the hydrocarbyl group; in some embodiments, there will be no non-hydrocarbon substituent in the hydrocarbyl group.

As used herein the term "aliphatic" encompasses the terms alkyl, alkenyl, alkynyl, each of which being optionally substituted as set forth below.

As used herein, an "alkyl" group refers to a saturated aliphatic hydrocarbon group containing 1-12 (e.g., 1-8, 1-6, or 1-4) carbon atoms. An alkyl group can be straight or branched. Examples of alkyl groups include, but are not limited to, methyl, ethyl, propyl, isopropyl, butyl, isobutyl, sec-butyl, tert-butyl, n-pentyl, n-heptyl, or 2-ethylhexyl. An alkyl group can be substituted (i.e., optionally substituted) with one or more substituents such as halo, phospho, cycloaliphatic [e.g., cycloalkyl or cycloalkenyl], heterocycloaliphatic [e.g., heterocycloalkyl or heterocycloalkenyl], aryl, heteroaryl, alkoxy, aroyl, heteroaroyl, acyl [e.g., (aliphatic) carbonyl, (cycloaliphatic)carbonyl, or (heterocycloaliphatic) carbonyl], nitro, cyano, amido [e.g., (cycloalkylalkyl)carbonylamino, arylcarbonylamino, aralkylcarbonylamino, (heterocycloalkyl) carbonylamino, (heterocycloalkylalkyl) carbonylamino, heteroarylcarbonylamino, heteroaralkyl carbonylamino alkylaminocarbonyl, cycloalkylaminocarbonyl, heterocycloalkylaminocarbonyl, arylaminocarbonyl, or heteroarylaminocarbonyl], amino [e.g., aliphaticamino, cycloaliphatic amino, or heterocycloaliphaticamino], sulfonyl [e.g., aliphatic-SO$_2$—], sulfinyl, sulfanyl, sulfoxy, urea, thiourea, sulfamoyl, sulfamide, oxo, carboxy, carbamoyl, cycloaliphaticoxy, heterocyclo aliphaticoxy, aryloxy, heteroaryloxy, aralkyloxy, heteroarylalkoxy, alkoxycarbonyl, alkyl carbonyloxy, or hydroxy. Without limitation, some examples of substituted alkyls include carboxyalkyl (such as HOOC-alkyl, alkoxycarbonylalkyl, and alkyl carbonyloxyalkyl), cyanoalkyl, hydroxyalkyl, alkoxyalkyl, acylalkyl, aralkyl, (alkoxyaryl)alkyl, (sulfonylamino) alkyl (such as (alkyl-SO$_2$-amino)alkyl), aminoalkyl, amidoalkyl, (cycloaliphatic)alkyl, or haloalkyl.

As used herein, an "alkenyl" group refers to an aliphatic carbon group that contains 2-8 (e.g., 2-12, 2-6, or 2-4) carbon atoms and at least one double bond. Like an alkyl group, an alkenyl group can be straight or branched. Examples of an alkenyl group include, but are not limited to allyl, isoprenyl, 2-butenyl, and 2-hexenyl. An alkenyl group can be optionally substituted with one or more substituents such as halo, phospho, cycloaliphatic [e.g., cycloalkyl or cycloalkenyl], heterocycloaliphatic [e.g., heterocycloalkyl or hetero cycloalkenyl], aryl, heteroaryl, alkoxy, aroyl, heteroaroyl, acyl [e.g., (aliphatic) carbonyl, (cycloaliphatic) carbonyl, or (heterocycloaliphatic)carbonyl], nitro, cyano, amido [e.g., (cycloalkylalkyl)carbonylamino, arylcarbonylamino, aralkylcarbonylamino, (hetero cycloalkyl) carbonylamino, (heterocyclo alkylalkyl) carbonylamino, heteroarylcarbonylamino, heteroaralkylcarbonylamino alkylamino carbonyl, cycloalkyl aminocarbonyl, hetero cyclo alkylaminocarbonyl, arylaminocarbonyl, or heteroarylaminocarbonyl], amino [e.g., aliphaticamino, cycloaliphaticamino, heterocyclo aliphaticamino, or aliphaticsulfonylamino], sulfonyl [e.g., alkyl-SO$_2$—, cycloaliphatic-S)$_2$—, or aryl-SO$_2$—], sulfinyl, sulfanyl, sulfoxy, urea, thiourea, sulfamoyl, sulfamide, oxo, carboxy, carbamoyl, cycloaliphaticoxy, heterocycloaliphaticoxy, aryloxy, heteroaryloxy, aralkyloxy, heteroaralkoxy, alkoxycarbonyl, alkylcarbonyloxy, or hydroxy. Without limitation, some examples of substituted alkenyls include cyanoalkenyl, alkoxyalkenyl, acylalkenyl, hydroxyl alkenyl, aralkenyl, (alkoxyaryl) alkenyl, (sulfonylamino)alkenyl (such as (alkyl-SO$_2$-amino) alkenyl), aminoalkenyl, amidoalkenyl, (cycloaliphatic)alkenyl, or haloalkenyl.

As used herein, an "alkynyl" group refers to an aliphatic carbon group that contains 2-8 (e.g., 2-12, 2-6, or 2-4) carbon atoms and has at least one triple bond. An alkynyl group can be straight or branched. Examples of an alkynyl group include, but are not limited to, propargyl and butynyl. An alkynyl group can be optionally substituted with one or more substituents such as aroyl, heteroaroyl, alkoxy, cycloalkyloxy, heterocycloalkyloxy, aryloxy, heteroaryloxy, aralkyl oxy, nitro, carboxy, cyano, halo, hydroxy, sulfo, mercapto, sulfanyl [e.g., aliphaticsulfanyl or cycloaliphaticsulfanyl], sulfinyl [e.g., aliphaticsulfinyl or cycloaliphaticsulfinyl], sulfonyl [e.g., aliphatic-SO$_2$—, aliphaticamino-SO$_2$—, or cycloaliphatic-SO$_2$—], amido [e.g., aminocarbonyl, alkylaminocarbonyl, alkylcarbonylamino, cyclo alkylaminocarbonyl, heterocycloalkylaminocarbonyl, cycloalkylcarbonylamino, arylamino carbonyl, arylcarbonylamino, aralkylcarbonylamino, (heterocycloalkyl) carbonylamino, (cycloalkylalkyl) carbonylamino, heteroaralkylcarbonylamino, heteroaryl carbonylamino or heteroaryl amino carbonyl], urea, thiourea, sulfamoyl, sulfamide, alkoxycarbonyl, alkyl carbonyloxy, cyclo aliphatic, heterocycloaliphatic, aryl, heteroaryl, acyl [e.g., (cycloaliphatic) carbonyl or (hetero cyclo aliphatic)carbonyl], amino [e.g., aliphaticamino], sulfoxy, oxo, carboxy, carbamoyl, (cycloaliphatic)oxy, (heterocyclo aliphatic) oxy, or (heteroaryl) alkoxy.

As used herein, an "amino" group refers to —NR$^X$R$^Y$ wherein each of R$^X$ and R$^Y$ is independently hydrogen, alkyl, cycloakyl, (cycloalkyl)alkyl, aryl, aralkyl, heterocycloalkyl, (heterocycloalkyl)alkyl, heteroaryl, carboxy, sulfanyl, sulfinyl, sulfonyl, (alkyl)carbonyl, (cycloalkyl)carbonyl, ((cycloalkyl)alkyl)carbonyl, arylcarbonyl, (aralkyl)carbonyl, (heterocyclo alkyl) carbonyl, ((heterocycloalkyl)alkyl)carbonyl, (heteroaryl)carbonyl, or (heteroaralkyl) carbonyl, each of which being defined herein and being optionally substituted. Examples of amino groups include alkylamino, dialkylamino, or arylamino. When the term "amino" is not the terminal group (e.g., alkylcarbonylamino), it is represented by —NR$^x$—. R$^x$ has the same meaning as defined above.

As used herein, a "cycloalkyl" group refers to a saturated carbocyclic mono- or bicyclic (fused or bridged) ring of 3-10 (e.g., 5-10) carbon atoms. Examples of cycloalkyl groups include cyclopropyl, cyclobutyl, cyclopentyl, cyclohexyl, cycloheptyl, adamantyl, norbornyl, cubyl, octahydroindenyl, decahydro-naphthyl, bicyclo[3.2.1]octyl, bicyclo[2.2.2] octyl, bicyclo[3.3.1]nonyl, bicyclo[3.3.2.]decyl, bicyclo[2.2.2]octyl, adamantyl, or ((aminocarbonyl)cycloalkyl)cycloalkyl.

As used herein, a "heterocycloalkyl" group refers to a 3-10 membered mono- or bicylic (fused or bridged) (e.g., 5- to 10-membered mono- or bicyclic) saturated ring structure, in which one or more of the ring atoms is a heteroatom (e.g., N, O, S, or combinations thereof). Examples of a heterocycloalkyl group include piperidyl, piperazyl, tetrahydropyranyl, tetrahydrofuryl, 1,4-dioxolanyl, 1,4-dithianyl, 1,3-dioxolanyl, oxazolidyl, isoxazolidyl, morpholinyl, thiomorpholyl, octahydrobenzofuryl, octahydrochromenyl, octahydrothio chromenyl, octahydroindolyl, octahydropyrindinyl, decahydroquinolinyl, octahydrobenzo[b] thiopheneyl, 2-oxa-bicyclo[2.2.2]octyl, 1-aza-bicyclo[2.2.2]octyl, 3-aza-bicyclo[3.2.1]octyl, and 2,6-dioxa-tricyclo[3.3.1.0]nonyl. A monocyclic heterocycloalkyl group can be fused with a phenyl moiety to form structures, such as tetrahydroisoquinoline, which would be categorized as heteroaryl s.

A "heteroaryl" group, as used herein, refers to a monocyclic, bicyclic, or tricyclic ring system having 4 to 15 ring atoms wherein one or more of the ring atoms is a heteroatom (e.g., N, O, S, or combinations thereof) and in which the monocyclic ring system is aromatic or at least one of the rings in the bicyclic or tricyclic ring systems is aromatic. A heteroaryl group includes a benzofused ring system having 2 to 3 rings. For example, a benzofused group includes benzo fused with one or two 4 to 8 membered heterocycloaliphatic moieties (e.g., indolizyl, indolyl, isoindolyl, 3H-indolyl, indolinyl, benzo[b]furyl, benzo[b]thiophenyl, quinolinyl, or isoquinolinyl). Some examples of heteroaryl are pyridyl, 1H-indazolyl, furyl, pyrrolyl, thienyl, thiazolyl, oxazolyl, imidazolyl, tetrazolyl, benzofuryl, isoquinolinyl, benzthiazolyl, xanthene, thioxanthene, phenothiazine, dihydroindole, benzo[1,3]dioxole, benzo[b]furyl, benzo[b] thiophenyl, indazolyl, benzimidazolyl, benzthiazolyl, puryl, cinnolyl, quinolyl, quinazolyl, cinnolyl, phthalazyl, quinazolyl, quinoxalyl, isoquinolyl, 4H-quinolizyl, benzo-1,2,5-thiadiazolyl, or 1,8-naphthyridyl.

Without limitation, monocyclic heteroaryls include furyl, thiophenyl, 2H-pyrrolyl, pyrrolyl, oxazolyl, thazolyl, imidazolyl, pyrazolyl, isoxazolyl, isothiazolyl, 1,3,4-thiadiazolyl, 2H-pyranyl, 4-H-pranyl, pyridyl, pyridazyl, pyrimidyl, pyrazolyl, pyrazyl, or 1,3,5-triazyl. Monocyclic heteroaryls are numbered according to standard chemical nomenclature.

Without limitation, bicyclic heteroaryls include indolizyl, indolyl, isoindolyl, 3H-indolyl, indolinyl, benzo[b]furyl, benzo[b]thiophenyl, quinolinyl, isoquinolinyl, indolizinyl, isoindolyl, indolyl, benzo[b]furyl, bexo[b]thiophenyl, indazolyl, benzimidazyl, benzthiazolyl, purinyl, 4H-quinolizyl, quinolyl, isoquinolyl, cinnolyl, phthalazyl, quinazolyl, quinoxalyl, 1,8-naphthyridyl, or pteridyl. Bicyclic heteroaryls are numbered according to standard chemical nomenclature.

Lubricating Oil Compositions

The novel lubricant additives, such as the novel dispersants, dispersant viscosity index improvers, dispersant viscosity modifiers, or other lubricant dispersants described herein may be blended into a major amount of base oil in combination with one or more further additives to produce a lubricating oil composition that has a robust and reduced boundary friction coefficient. The lubricating oil compositions herein may include about 0.1 wt % to about 10 wt %, or about 1 wt % to about 8 wt %, or about 3 wt % to about 10 wt %, or about 1 wt % to about 6 wt %, or about 2 wt % to about 4 wt %, of the inventive dispersant, based upon the weight of the lubricant composition. In some embodiments, the lubricant composition utilizes a mixed dispersant system in combination with one or more further additives. In other approaches, the lubricant oil formulation may include amounts of the dispersants herein ranging from at least about 0.1 weight percent, at least about 0.5 weight percent, at least about 1 weight percent, at least about 2 weight percent, or at least about 4 weight percent and at most 10 weight percent, at most 8 weight percent, at most 6 weight percent, or at most 5 weight percent.

Base Oil

The base oil or base oil of lubricating viscosity used in the lubricating oil compositions herein may be selected from any suitable base oil. Examples include the base oils in Groups I-V as specified in the American Petroleum Institute (API) Base Oil Interchangeability Guidelines. These five base oil groups are as follows:

TABLE 1

| Base oil Category | Sulfur (%) | | Saturates (%) | Viscosity Index |
|---|---|---|---|---|
| Group I | >0.03 | and/or | <90 | 80 to 120 |
| Group II | ≤0.03 | and | ≥90 | 80 to 120 |
| Group III | ≤0.03 | and | ≥90 | ≥120 |
| Group IV | All polyalphaolefins (PAOs) | | | |
| Group V | All others not included in Groups I, II, III, or IV | | | |

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may be referred to as synthetic fluids in the industry.

The base oil used in the disclosed lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, and mixtures thereof.

Unrefined oils are those derived from a natural, mineral, or synthetic source without or with little further purification treatment. Refined oils are similar to the unrefined oils except that they have been treated in one or more purification steps, which may result in the improvement of one or more properties. Examples of suitable purification techniques are solvent extraction, secondary distillation, acid or base extraction, filtration, percolation, and the like. Oils refined to the quality of an edible may or may not be useful. Edible oils may also be called white oils. In some embodiments, lubricating oil compositions are free of edible or white oils.

Re-refined oils are also known as reclaimed or reprocessed oils. These oils are obtained similarly to refined oils using the same or similar processes. Often these oils are additionally processed by techniques directed to removal of spent additives and oil breakdown products.

Mineral oils may include oils obtained by drilling or from plants and animals or any mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(l-hexenes), poly(l-octenes), trimers or oligomers of 1-decene, e.g., poly(1-decenes), such materials being often referred to as alpha-olefins, and mixtures thereof alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof. Polyalphaolefins are typically hydrogenated materials.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In one embodiment oils may be prepared by a Fischer-Tropsch gas-to-liquid synthetic procedure as well as other gas-to-liquid oils.

The major amount of base oil included in a lubricating composition may be selected from the group consisting of Group I, Group II, a Group III, a Group IV, a Group V, and a combination of two or more of the foregoing, and wherein the major amount of base oil is other than base oils that arise from provision of additive components or viscosity index improvers in the composition. In another embodiment, the major amount of base oil included in a lubricating composition may be selected from the group consisting of Group II, a Group III, a Group IV, a Group V, and a combination of two or more of the foregoing, and wherein the major amount of base oil is other than base oils that arise from provision of additive components or viscosity index improvers in the composition.

The amount of the oil of lubricating viscosity in the compositions herein may be the balance remaining after subtracting from 100 wt % the sum of the amount of the performance additives. For example, the oil of lubricating viscosity that may be present in a finished fluid may be a "major amount," such as greater than about 50 wt %, greater than about 60 wt %, greater than about 70 wt %, greater than about 80 wt %, greater than about 85 wt %, greater than about 90 wt %, or greater than 95 wt %.

In some approaches, a preferred base oil or base oil of lubricating viscosity has less than about 25 ppm sulfur, a viscosity index greater than about 120, and a kinematic viscosity at about 100° C. of about 2 to about 8 cSt. In other approaches, the base oil of lubricating viscosity has less than about 25 ppm sulfur, a viscosity index greater than 120, and a kinematic viscosity at 100° C. of about 4 cSt. The base oil may have CP (paraffinic carbon content) of greater than 40%, greater than 45%, greater than 50%, greater than 55%, or greater than 90%. The base oil may have a $C_A$ (aromatic carbon content) of less than 5%, less than 3%, or less than 1%. The base oil may have a $C_N$ (naphthenic carbon content) of less than 60%, less than 55%, less than 50%, or less than 50% and greater than 30%. The base oil may have a ratio of 1 ring naphthenes to 2-6 ring naphthenes of less than 2 or less than 1.5 or less than 1.

Other optional additives of the lubricating oils are described below.

Detergents

The lubricant composition may optionally further comprise one or more neutral, low based, or overbased detergents, and mixtures thereof.

Suitable detergent substrates include phenates, sulfur-containing phenates, sulfonates, calixarates, salixarates, salicylates, carboxylic acids, phosphorus acids, mono- and/or di-thiophosphoric acids, alkyl phenols, sulfur coupled alkyl phenol compounds, or methylene bridged phenols. Suitable detergents and their methods of preparation are described in greater detail in numerous patent publications, including U.S. Pat. No. 7,732,390 and references cited therein. The detergent substrate may be salted with an alkali or alkaline earth metal such as, but not limited to, calcium, magnesium, potassium, sodium, lithium, barium, zinc, or mixtures thereof.

A suitable detergent may include alkali or alkaline earth metal salts, e.g., calcium or magnesium, of petroleum sulfonic acids and long chain mono- or di-alkylaryl sulfonic acids with the aryl group being benzyl, tolyl, and xylyl. Examples of other suitable detergents include, but are not limited to low-based/neutral and overbased variations of the following detergents: calcium phenates, calcium sulfur containing phenates, calcium sulfonates, calcium calixarates, calcium salixarates, calcium salicylates, calcium carboxylic acids, calcium phosphorus acids, calcium mono- and/or di-thiophosphoric acids, calcium alkyl phenols, calcium sulfur coupled alkyl phenol compounds, calcium methylene bridged phenols, magnesium phenates, magnesium sulfur containing phenates, magnesium sulfonates, magnesium calixarates, magnesium salixarates, magnesium salicylates, magnesium carboxylic acids, magnesium phosphorus acids, magnesium mono- and/or di-thiophosphoric acids, magnesium alkyl phenols, magnesium sulfur coupled alkyl phenol compounds, magnesium methylene bridged phenols, sodium phenates, sodium sulfur containing phenates, sodium sulfonates, sodium calixarates, sodium salixarates, sodium salicylates, sodium carboxylic acids, sodium phosphorus acids, sodium mono- and/or di-thiophosphoric acids, sodium alkyl phenols, sodium sulfur coupled alkyl phenol compounds, or sodium methylene bridged phenols.

The detergent may be present at about 0 wt % to about 10 wt %, or about 0.1 wt % to about 8 wt %, or about 1 wt % to about 4 wt %, or greater than about 4 wt % to about 8 wt %. In other approaches, the detergent may be provided in the lubricating oil composition in an amount to provide about 450 to about 2200 ppm metal to the lubricant composition and to deliver a soap content of about 0.4 to about 1.5 weight percent to the lubricant composition. In other approaches, the detergent is in an amount to provide about 450 to about 2200 ppm metal to the lubricant composition and to deliver a soap content of about 0.4 to about 0.7 weight percent to the lubricant composition.

Overbased detergent additives are well-known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol.

The term "overbased" relates to metal salts, such as metal salts of sulfonates, carboxylates, salicylates and/or phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the MR is one and in an overbased salt, MR, is greater than one. They are commonly referred to as overbased, hyperbased, or superbased salts and may be salts of organic sulfur acids, carboxylic acids, or phenols.

As used herein, the term "TBN" is used to denote the Total Base Number in mg KOH/g as measured by the method of ASTM D2896. An overbased detergent of the lubricating oil composition may have a total base number (TBN) of about 200 mg KOH/gram or greater, or about 250 mg KOH/gram or greater, or about 350 mg KOH/gram or greater, or about 375 mg KOH/gram or greater, or about 400 mg KOH/gram or greater. The overbased detergent may have a metal to substrate ratio of from 1.1:1, or from 2:1, or from 4:1, or from 5:1, or from 7:1, or from 10:1.

Examples of suitable overbased detergents include, but are not limited to, overbased calcium phenates, overbased calcium sulfur containing phenates, overbased calcium sulfonates, overbased calcium calixarates, overbased calcium salixarates, overbased calcium salicylates, overbased calcium carboxylic acids, overbased calcium phosphorus acids, overbased calcium mono- and/or di-thiophosphoric acids, overbased calcium alkyl phenols, overbased calcium sulfur coupled alkyl phenol compounds, overbased calcium methylene bridged phenols, overbased magnesium phenates, overbased magnesium sulfur containing phenates, overbased magnesium sulfonates, overbased magnesium calixarates, overbased magnesium salixarates, overbased magnesium salicylates, overbased magnesium carboxylic acids, overbased magnesium phosphorus acids, overbased magnesium mono- and/or di-thiophosphoric acids, overbased magnesium alkyl phenols, overbased magnesium sulfur coupled alkyl phenol compounds, or overbased magnesium methylene bridged phenols.

The overbased detergent may comprise at least 97.5 wt % of the total detergent in the lubricating oil composition. In some embodiments, at least 96 wt %, or at least 94 wt %, or at least 92 wt %, or at least 90 wt % or at least 88 wt % or at least 80 wt % of the total detergent in the lubricating oil composition is overbased detergent.

The low-based/neutral detergent has a TBN of up to 175 mg KOH/g, or up to 150 mg KOH/g. The low-based/neutral detergent may include a calcium or magnesium-containing detergent. Examples of suitable low-based/neutral detergent include, but are not limited to, calcium sulfonates, calcium phenates, calcium salicylates, magnesium sulfonates, magnesium phenates, and magnesium salicylates. In some embodiments, the low-based/neutral detergent is a mixture of calcium-containing detergents and or magnesium-containing detergents.

The low-based/neutral detergent may comprise at least 2.5 wt % of the total detergent in the lubricating oil composition. In some embodiments, at least 4 wt %, or at least 6 wt %, or at least 8 wt %, or at least 10 wt % or at least 12 wt % or at least 20 wt % of the total detergent in the lubricating oil composition is a low-based/neutral detergent which may optionally be a low-based/neutral calcium-containing detergent. In certain embodiments, the one or more low-based/neutral detergents provide from about 50 to about 1000 ppm calcium or magnesium by weight to the lubricating oil composition based on a total weight of the lubricating oil composition. In some embodiments, the one or more low-based/neutral calcium-containing detergents provide from 75 to less than 800 ppm, or from 100 to 600 ppm, or from 125 to 500 ppm by weight calcium or magnesium to the lubricant composition based on a total weight of the lubricant composition.

Phosphorus-Containing Compounds

The lubricant composition herein may comprise one or more phosphorus-containing compounds that may impart anti-wear benefits to the fluid. The one or more phosphorus-containing compounds may be present in the lubricating oil composition in an amount ranging from about 0 wt % to about 15 wt %, or about 0.01 wt % to about 10 wt %, or about 0.05 wt % to about 5 wt %, or about 0.1 wt % to about 3 wt % of the lubricating oil composition. The phosphorus-containing compound may provide up to 5000 ppm phosphorus, or from about 50 to about 5000 ppm phosphorus, or from about 300 to about 1500 ppm phosphorus, or up to 600 ppm phosphorus, or up to 900 ppm phosphorus to the lubricant composition. The one or more phosphorus-containing compounds include metal containing phosphorus-containing compounds and/or ashless phosphorus-containing compounds. Examples of suitable phosphorus-containing compound include, but are not limited to, thiophosphates, dithiophosphates, metal phosphates, metal thiophosphates, metal dithiophosphates, phosphates, phosphoric acid esters, phosphate esters, phosphites, phosphonates, phosphorus-containing carboxylic esters, ethers, or amides salts thereof, and mixtures thereof. Phosphorus containing anti-wear agents are more fully described in European Patent 0612839. It should be noted that often the term phosphonate and phosphite are used often interchangeably in the lubricant industry. For example, dibutyl hydrogen phosphonate is often referred to as dibutyl hydrogen phosphite. It is within the scope of the present invention for the inventive lubricant composition to include a phosphorus-containing compound that may be referred to as either a phosphite or a phosphonate.

In any of the above described phosphorus-containing compounds, the compound may have about 5 to about 20 weight percent phosphorus, or about 5 to about 15 weight percent phosphorus, or about 8 to about 16 weight percent phosphorus, or about 6 to about 9 weight percent phosphorus.

The inclusion of the phosphorus-containing compound in combination with the above described dispersant to a lubricant compositions unexpectedly imparts positive frictional characteristics, such as a low friction coefficient, to the lubricant composition. The inventive effect is even further pronounced in some cases where the phosphorus-containing compound, on its own, imparts negative frictional characteristics to the fluid. When these relatively poor friction reducing phosphorus-containing compounds are combined with the olefin copolymer dispersant described herein, the lubricant composition has an improved, i.e., lower, friction coefficient. That is, the dispersants herein tend to transform fluids containing phosphorus-containing compounds having relatively poor friction coefficients into fluids with improved frictional properties.

This improvement in frictional properties of the lubricating compositions including the phosphorus-containing compounds and the olefin copolymer dispersant described herein is surprising because the frictional properties of the fluid are better than combinations of the phosphorus-containing compounds in combination with other types of dispersants, including polyisobutylene succinimide dispersants and olefin copolymer succinimide dispersants that do not have the specified characteristics of the copolymers described above.

One type of phosphorus-containing compound that when combined with the dispersant herein imparts improved frictional characteristics to a lubricating composition is a metal dihydrocarbyl dithiophosphate compound, such as but not limited to, a zinc dihydrocarbyl dithiophosphate compound (ZDDP). When the phosphorus-containing compound is a metal thiophosphate or metal dithiophosphate, such as ZDDP, it may include between 5 to about 10 weight percent metal, about 6 to about 9 weight percent metal, about 8 to 18 weight percent sulfur, about 12 to about 18 weight percent sulfur, or about 8 to about 15 weight percent sulfur. Suitable metal dihydrocarbyl dithiophosphates may comprise dihydrocarbyl dithiophosphate metal salts wherein the metal may be an alkali metal, alkaline earth metal, aluminum, lead, tin, molybdenum, manganese, nickel, copper, titanium, zirconium, zinc, or combinations thereof.

When the phosphorus-containing compound is a ZDDP, the alkyl groups on ZDDP may be derived from primary alcohols, secondary alcohols, phenols, and/or mixtures thereof. For example, all of the alkyl groups of ZDDP may be derived from a secondary alcohol such as methyl isobutyl carbinol, or from a mixture of secondary alcohols such as methyl isobutyl carbinol and isopropyl alcohol. In some cases, the alkyl groups of the ZDDP may be derived from a mixture of primary and secondary alcohols, such as 2-ethyl hexanol, isobutanol, and isopropanol. For example, in one embodiment, about 20% of the alkyl groups are derived from 2-ethyl hexanol, about 40% of the alkyl groups are derived from isobutanol, and about 40% of the alkyl groups are derived from isopropanol. In other embodiments, all of the alkyl groups on the ZDDP may be derived from a primary alcohol, such as 2-ethyl hexanol. ZDDPs may include about 6 to about 10 weight percent phosphorus, about 6 to about 9 weight percent zinc, and about 12 to about 18 weight percent sulfur.

Examples of such ZDDPs include, but are not limited to: zinc O,O-di($C_{1-14}$-alkyl)dithiophosphate; zinc (mixed O,O-bis(sec-butyl and isooctyl)) dithiophosphate; zinc-O,O-bis (branched and linear $C_{3-8}$-alkyl)dithiophosphate; zinc O,O-bis(2-ethylhexyl)dithiophosphate; zinc O,O-bis(mixed isobutyl and pentyl)dithiophosphate; zinc mixed O,O-bis(1,3-dimethylbutyl and isopropyl)dithiophosphate; zinc O,O-diisooctyl dithiophosphate; zinc O,O-dibutyl dithiophosphate; zinc mixed O,O-bis(2-ethylhexyl and isobutyl and isopropyl)dithiophosphate; zinc O,O-bis(dodecylphenyl)dithiophosphate; zinc O,O-diisodecyl dithiophosphate; zinc O-(6-methylheptyl)-O-(1-methylpropyl)dithiophosphate; zinc O0-(2-ethylhexyl)-O-(isobutyl)dithiophosphate; zinc O,O-diisopropyl dithiophosphate; zinc (mixed hexyl and isopropyl)dithiophosphate; zinc (mixed O-(2-ethylhexyl) and O-isopropyl) dithiophosphate; zinc O,O-dioctyl dithiophosphate; zinc O,O-dipentyl dithiophosphate; zinc O-(2-methylbutyl)-O-(2-methylpropyl)dithiophosphate; and zinc O-(3-methylbutyl)-O-(2-methylpropyl)dithiophosphate.

The phosphorus-containing compound may have the formula:

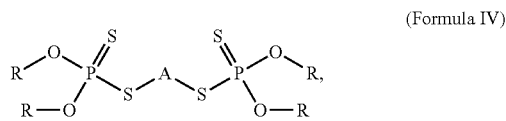
(Formula IV)

wherein R in Formula IV independently contains from 1 to 18 carbon atoms, or 2 to 12 carbon atoms, or about 3 to 8 carbon atoms. For example, R may be ethyl, n-propyl, propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. The number of carbon atoms in each R group in the formula above will generally be about 3 or greater, about 4 or greater, about 6 or greater, or about 8 or greater. Each R group may average 3 to 8 carbons. The total number of carbon atoms in the R groups may be 5 to about 72, or 12 to about 32. In Formula IV, A is a metal, such as aluminum, lead, tin, molybdenum, manganese, nickel, copper, titanium, zirconium, zinc, or combinations thereof. When the phosphorus-containing compound has the structure shown in Formula IV, the compound may have about 6 to about 9 weight percent phosphorus.

In some embodiments, the phosphorous-containing compound of the present invention has the structure of Formula IV wherein A is zinc and the compound provides between 70-800 ppm phosphorus to the lubricant composition.

It is understood in the art that a more accurate representation of the sulfur-zinc coordination arrangement may be represented by the symmetrical arrangement shown below the chemical structure of Formula IV used herein is interchangeable with Formula IV' shown below. It is also understood that the structures shown in Formulas IV and IV' may be present as monomer, dimer, trimer, or oligomer (such as a tetramer).

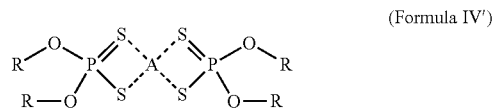
(Formula IV')

Dihydrocarbyl dithiophosphate metal salts may be prepared in accordance with known techniques by first forming a dihydrocarbyl dithiophosphoric acid (DDPA), usually by reaction of one or more alcohols or phenols with $P_2S_5$ and then neutralizing the formed DDPA with a metal compound, such as zinc oxide. For example, DDPA may be made by reacting mixtures of primary and secondary alcohols with $P_2S_5$. In this case, the DDPA includes alkyl groups derived from both primary and secondary alcohols. Alternatively, multiple DDPAs can be prepared where the alkyl groups on one DDPA are derived entirely from secondary alcohols and the alkyl groups on another DDPA are derived entirely from primary alcohols. The DDPAs are then blended together to form a mixture of DDPAs having alkyl groups derived from both primary and secondary alcohols.

To make the metal salt, any basic or neutral metal compound could be used but the oxides, hydroxides and carbonates are most generally employed. Commercial additives frequently contain an excess of metal due to the use of an excess of the basic metal compound in the neutralization reaction.

Another type of phosphorus-containing compound that when combined with the olefin copolymer dispersant herein imparts improved frictional characteristics to a lubricating composition is an ashless (metal free) phosphorus-containing compound.

In some embodiments, the ashless phosphorus-containing compound may be dialkyl dithiophosphate ester, amyl acid phosphate, diamyl acid phosphate, dibutyl hydrogen phosphonate, dimethyl octadecyl phosphonate, salts thereof, and mixtures thereof.

The ashless phosphorus-containing compound may be have the formula:

(Formula V)

wherein in Formula V: $R_1$ is S or O; $R_2$ is —OR", —OH, or —R"; $R_3$ is —OR", —OH, or SR'''C(O)OH; $R_4$ is —OR"; R''' is $C_1$ to $C_3$ branched or linear alkyl chain; and R" is a C1 to C18 hydrocarbyl chain. When the phosphorous-containing compound has the structure shown in Formula V, the compound may have about 8 to about 16 weight percent phosphorus.

In some embodiments the lubricant composition comprises a phosphorus-containing compound of Formula V wherein $R_1$ is S; $R_2$ is —OR"; $R_3$ is S R'''COOH; $R_4$ is —OR"; R''' is $C_3$ branched alkyl chain; R" is $C_4$; and wherein the phosphorus-containing compound is present in an amount to deliver between 80-900 ppm phosphorus to the lubricant composition.

In another embodiment, the lubricant composition comprises a phosphorus-containing compound of Formula V wherein $R_1$ is O; $R_2$ is —OH; $R_3$ is —OR" or —OH; $R_4$ is —OR"; R" is $C_5$; and wherein phosphorus-containing compound is present in an amount to deliver between 80-1500 ppm phosphorus to the lubricant composition.

In yet another embodiment, the lubricant composition comprises a phosphorus-containing compound of Formula V wherein $R_1$ is O; $R_2$ is OR"; $R_3$ is H; $R_4$ is —OR"; R" is $C_4$; and wherein the one or more phosphorus-containing compound(s) is present in an amount to deliver between 80-1550 ppm phosphorus to the lubricant composition.

In other embodiments, the lubricant composition comprises a phosphorus-containing compound of Formula V wherein $R_1$ is O; $R_2$ is -R"; $R_3$ is —OCH$_3$ or —OH; $R_4$ is —OCH$_3$; R" is $C_{18}$; and wherein the one or more phosphorus-containing compound(s) is present in an amount to deliver between 80-850 ppm phosphorus to the lubricant composition.

Additional Anti-Wear Agents

The lubricant composition may also include additional anti-wear agents that are non-phosphorus-containing compounds. Examples of such antiwear agents include borate esters, borate epoxides, thiocarbamate compounds (including thiocarbamate esters, alkylene-coupled thiocarbamates, and bis(S-alkyldithiocarbamyl)disulfides, thiocarbamate amides, thiocarbamic ethers, alkylene-coupled thiocarbamates, and bis(S-alkyldithiocarbamyl) disulfides, and mixtures thereof), sulfurized olefins, tridecyl adipate, titanium compounds, and long chain derivatives of hydroxyl carboxylic acids, such as tartrate derivatives, tartramides, tartrimides, citrates, and mixtures thereof. A suitable thiocarbamate compound is molybdenum dithiocarbamate. Suitable tartrate derivatives or tartrimides may contain alkyl-ester groups, where the sum of carbon atoms on the alkyl groups may be at least 8. The tartrate derivative or tartrimide may contain alkyl-ester groups, where the sum of carbon atoms on the alkyl groups may be at least 8. The antiwear agent may in one embodiment include a citrate. The additional anti-wear agent may be present in ranges including about 0 wt % to about 15 wt %, or about 0.01 wt % to about 10 wt %, or about 0.05 wt % to about 5 wt %, or about 0.1 wt % to about 3 wt % of the lubricating oil composition.

In some embodiments, the phosphorus-containing compound has the structure shown in Formula V and delivers about 80 to about 4500 ppm phosphorus to the lubricant composition. In other embodiments, the phosphorus-containing compound is present in an amount to deliver between about 150 and about 1500 ppm phosphorus, or between about 300 and about 900 ppm phosphorus, or between about 800 to 1600 ppm phosphorus, or about 900 to about 1800 ppm phosphorus, to the lubricant composition.

Friction Modifiers

The lubricating oil compositions herein also may optionally contain one or more friction modifiers, such as friction modifiers selected from organic ashless nitrogen-free friction modifiers, organic ashless aminic friction modifiers, inorganic friction modifiers, and mixtures thereof. Suitable friction modifiers may also include metal containing and metal-free friction modifiers and may include, but are not limited to, imidazolines, amides, amines, succinimides, alkoxylated amines, alkoxylated ether amines, amine oxides, amidoamines, nitriles, betaines, quaternary amines, imines, amine salts, amino guanidine, alkanolamides, phosphonates, metal-containing ompounds, glycerol esters, borated glycerol esters, partial esters of glycerol such as glycerol monooleate, fatty phosphites, fatty epoxides, sulfurized fatty compounds and olefins, sunflower oil other naturally occurring plant or animal oils, dicarboxylic acid esters, esters or partial esters of a polyol, one or more aliphatic or aromatic carboxylic acids, and the like. A friction modifier may optionally be included in the lubricating oil compositions herein in ranges from about 0 wt % to about 10 wt %, or about 0.01 wt % to about 8 wt %, or about 0.1 wt % to about 4 wt %.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In some embodiments the friction modifier may be a long chain fatty acid ester. In another embodiment the long chain fatty acid ester may be a mono-ester, or a di-ester, or a (tri)glyceride. The friction modifier may be a long chain fatty amide, long chain fatty amine, a long chain fatty ester, a long chain fatty epoxide derivative, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685, herein incorporated by reference in its entirety.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291, herein incorporated by reference in its entirety.

Suitable friction modifiers include glycerides, fatty acids, glycerol monooleate, fatty alkyl tartrate derivatives, imidazolines, alkoxy amines, alkyl fatty amines, acyl glycines, cerium nanoparticles, titanium-containing compounds, molybdenum-containing compounds, and mixtures thereof. The titanium-containing compound may be a reaction product of titanium alkoxide and neodecanoic acid. The cerium nanoparticle may be obtained from the reaction product of an organo-cerium salt, a fatty acid, and an amine in the substantial absence of water and organic solvent at a temperature from about 150° C. to about 250° C. The cerium nanoparticles may have a particle size less than about 10 nanometers. Suitable fatty acids may be those including $C_{10}$ to $C_{30}$ saturated, monounsaturated, or polyunsaturated carboxylic acid and the amine is a fatty amine selected from $C_8$ to $C_{30}$ saturated or unsaturated amines.

In some approaches, the friction modifier may be a glycerides having the formula

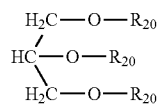

(Formula VI)

wherein in each Rzo is independently selected from the group consisting of H and —C(O)R''' wherein R''' may be a saturated or an unsaturated alkyl group having from 3 to 23 carbon atoms.

The friction modifier may also be imidazolines having the formula

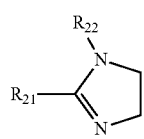

(Formula VII)

wherein $R_{21}$ is an alkyl or alkenyl group containing from about 10 to about 30 carbon atoms and $R_{22}$ is a hydroxyalkyl group containing from about 2 to about 4 carbon atoms.

The friction modifier may also be alkoxy amines including an N-aliphatic hydrocarbyl-substituted diethanolamine in which the N-aliphatic hydrocarbyl-substituent is at least one straight chain aliphatic hydrocarbyl group free of acetylenic unsaturation and having 14 to 20 carbon atoms.

The friction modifier may further be an alkyl fatty amines include aliphatic primary fatty amines selected from n-hexylamine, n-octylamine, n-decylamine, n-dodecylamine, n-tetradecylamine, n-pentadecylamine, n-hexadecylamine, n-octadecylamine, and mixtures thereof;

The friction modifier may be an acyl glycine and have the formula

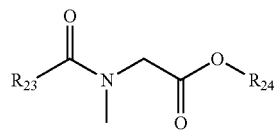

(Formula VIII)

wherein $R_{23}$ is a linear or branched, saturated, unsaturated, or partially saturated hydrocarbyl having about 8 to about 22 carbon atoms and $R_{24}$ is hydrogen, a hydrocarbyl having 1 to 8 carbon atoms, or a $C_1$ to $C_8$ hydrocarbyl group containing one or more heteroatoms.

Extreme Pressure Agents

The lubricant compositions of the disclosure may also contain at least one extreme pressure agent. The extreme pressure agent may contain sulfur and may contain at least 12 percent by weight sulfur. In some embodiments, the extreme pressure agent added to the lubricating oil is sufficient to provide at least 350 ppm sulfur, 500 ppm sulfur, 760 ppm sulfur, from about 350 to about 2,000 ppm sulfur, from about 2,000 to about 30,000 ppm sulfur, or from about 2,000 to about 4,800 ppm sulfur, or about 4,000 to about 25,000 ppm sulfur to the lubricant composition.

A wide variety of sulfur-containing extreme pressure agents are suitable and include sulfurized animal or vegetable fats or oils, sulfurized animal or vegetable fatty acid esters, fully or partially esterified esters of trivalent or pentavalent acids of phosphorus, sulfurized olefins (see, for example U.S. Pat. Nos. 2,995,569; 3,673,090; 3,703,504; 3,703,505; 3,796,661; 3,873,454 4,119,549; 4,119,550; 4,147,640; 4,191,659; 4,240,958; 4,344,854; 4,472,306; and 4,711,736), dihydrocarbyl polysulfides (see for example U.S. Pat. Nos. 2,237,625; 2,237,627; 2,527,948; 2,695,316; 3,022,351; 3,308,166; 3,392,201; 4,564,709; and British 1,162,334), functionally-substituted dihydrocarbyl polysulfides (see for example U.S. Pat. No. 4,218,332), and polysulfide olefin products (see for example U.S. Pat. No. 4,795,576). Other suitable examples include organo-sulfur compounds selected from sulfurized olefins, sulfur-containing amino heterocyclic compounds, 5-dimercapto-1,3,4-thiadiazole, polysulfides having a majority of $S_3$ and $S_4$ sulfides, sulfurized fatty acids, sulfurized branched olefins, organic polysulfides, and mixtures thereof.

In some embodiments the extreme pressure agent is present in the lubricating composition in an amount of up to about 3.0 wt % or up to about 5.0 wt %. In other embodiments, the extreme pressure agent is present from about 0.05 wt % to about 0.5 wt %, based on the total lubricant composition. In other embodiments, the extreme pressure agent is present from about 0.1 wt % to about 3.0 wt %, based on the total lubricant composition. In other embodiments the extreme pressure agent is present in an amount between about 0.6 wt % and about 1 wt %, based on the total lubricant composition. In yet other embodiments, the detergent is present in an amount of about 1.0 wt %, based on the total lubricant composition.

One suitable class of extreme pressure agents are polysulfides composed of one or more compounds represented by the formula: $R_a$—$S_x$—$R_b$ where $R_a$ and $R_b$ are hydrocarbyl groups each of which may contain 1 to 18, and in other approaches, 3 to 18 carbon atoms and x is may be in the range of from 2 to 8, and typically in the range of from 2 to 5, especially 3. In some approaches, x is an integer from 3 to 5 with about 30 to about 60 percent of x being an integer of 3 or 4. The hydrocarbyl groups can be of widely varying types such as alkyl, cycloalkyl, alkenyl, aryl, or aralkyl. Tertiary alkyl polysulfides such as di-tert-butyl trisulfide, and mixtures comprising di-tert-butyl trisulfide (e.g., a mixture composed principally or entirely of the tri, tetra-, and pentasulfides) may be used. Examples of other useful dihydrocarbyl polysulfides include the diamyl polysulfides, the dinonyl polysulfides, the didodecyl polysulfides, and the dibenzyl polysulfides.

Another suitable class of extreme pressure agent is sulfurized isobutenes made by reacting an olefin, such as isobutene, with sulfur. Sulfurized isobutene (SIB), notably sulfurized polyisobutylene, typically has a sulfur content of from about 10 to about 55%, desirably from about 30 to about 50% by weight. A wide variety of other olefins or unsaturated hydrocarbons, e.g., isobutene dimer or trimer, may be used to form the sulfurized olefin extreme pressure agents. Various methods have been disclosed in the prior art for the preparation of sulfurized olefins. See, for example, U.S. Pat. No. 3,471,404 to Myers; U.S. Pat. No. 4,204,969 to Papay et al.; U.S. Pat. No. 4,954,274 to Zaweski et al.; U.S. Pat. No. 4,966,720 to DeGonia et al.; and U.S. Pat. No. 3,703,504 to Horodysky, et al, each of which his incorporated herein by reference.

Methods for preparing sulfurized olefins, including the methods disclosed in the aforementioned patents, generally involve formation of a material, typically referred to as an "adduct", in which an olefin is reacted with a sulfur halide, for example, sulfur monochloride. The adduct is then reacted with a sulfur source to provide the sulfurized olefin. The quality of a sulfurized olefin is generally measured by various physical properties, including, for example, viscosity, sulfur content, halogen content and copper corrosion test weight loss. U.S. Pat. No. 4,966,720, relates to sulfurized olefins useful as extreme pressure additives in lubrication oils and to a two stage reaction for their preparation.

Antioxidants

The lubricating oil compositions herein also may optionally contain one or more antioxidants. Antioxidant compounds are known and include for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidant compounds may be used alone or in combination.

The hindered phenol antioxidant may contain a secondary butyl and/or a tertiary butyl group as a sterically hindering group. The phenol group may be further substituted with a hydrocarbyl group and/or a bridging group linking to a second aromatic group. Examples of suitable hindered phenol antioxidants include 2,6-di-tert-butylphenol, 4-methyl-2,6-di-tert-butylphenol, 4-ethyl-2,6-di-tert-butylphenol, 4-propyl-2,6-di-tert-butylphenol or 4-butyl-2,6-di-tert-butylphenol, or 4-dodecyl-2,6-di-tert-butylphenol. In one embodiment the hindered phenol antioxidant may be an ester and may include, e.g., Irganox® L-135 available from BASF or an addition product derived from 2,6-di-tert-butylphenol and an alkyl acrylate, wherein the alkyl group may contain about 1 to about 18, or about 2 to about 12, or about 2 to about 8, or about 2 to about 6, or about 4 carbon atoms. Another commercially available hindered phenol antioxidant may be an ester and may include Ethanox® 4716 available from Albemarle Corporation.

Useful antioxidants may include diarylamines and phenols. In an embodiment, the lubricating oil composition may contain a mixture of a diarylamine and a phenol, such that each antioxidant may be present in an amount sufficient to provide up to about 5 wt %, based on the weight of the lubricant composition. In an embodiment, the antioxidant may be a mixture of about 0.3 to about 1.5 wt % diarylamine and about 0.4 to about 2.5 wt % phenol, based on the lubricant composition.

Examples of suitable olefins that may be sulfurized to form a sulfurized olefin include propylene, butylene, isobutylene, polyisobutylene, pentene, hexene, heptene, octene, nonene, decene, undecene, dodecene, tridecene, tetradecene, pentadecene, hexadecene, heptadecene, octadecene, nonadecene, eicosene or mixtures thereof. In one embodiment, hexadecene, heptadecene, octadecene, nonadecene, eicosene or mixtures thereof and their dimers, trimers and tetramers are especially useful olefins. Alternatively, the olefin may be a Diels-Alder adduct of a diene such as 1,3-butadiene and an unsaturated ester, such as, butylacrylate.

Another class of sulfurized olefin includes sulfurized fatty acids and their esters. The fatty acids are often obtained from vegetable oil or animal oil and typically contain about 4 to about 22 carbon atoms. Examples of suitable fatty acids and their esters include triglycerides, oleic acid, linoleic acid, palmitoleic acid or mixtures thereof. Often, the fatty acids are obtained from lard oil, tall oil, peanut oil, soybean oil, cottonseed oil, sunflower seed oil or mixtures thereof. Fatty acids and/or ester may be mixed with olefins, such as α-olefins.

The one or more antioxidant(s) may be present in ranges about 0 wt % to about 20 wt %, or about 0.1 wt % to about 10 wt %, or about 1 wt % to about 5 wt %, of the lubricating oil composition.

Boron-Containing Compounds

The lubricant composition herein may optionally contain one or more boron-containing compounds. Examples of boron-containing compounds include borate esters, borated fatty amines, borated epoxides, borated detergents, and borated dispersants, such as borated succinimide dispersants, as disclosed in U.S. Pat. No. 5,883,057. The boron-containing compound, if present, can be used in an amount sufficient to provide the lubricant compsotion with a boron level of up to about 3000 ppm, about 5 ppm to about 2000 ppm, about 15 ppm to about 600 ppm, about 20 ppm to about 400 ppm, about 70 ppm to about 300 ppm.

Additional Dispersants

Additional dispersants contained in the lubricant composition may include, but are not limited to, an oil soluble polymeric hydrocarbon backbone having functional groups that are capable of associating with particles to be dispersed. Typically, the dispersants comprise amine, alcohol, amide, or ester polar moieties attached to the polymer backbone often via a bridging group. Dispersants may be selected from Mannich dispersants as described in U.S. Pat. Nos. 3,634,515, 3,697,574 and 3,736,357; ashless succinimide dispersants as described in U.S. Pat. Nos. 4,234,435 and 4,636,322; amine dispersants as described in U.S. Pat. Nos. 3,219,666, 3,565,804, and 5,633,326; Koch dispersants as described in U.S. Pat. Nos. 5,936,041, 5,643,859, and 5,627,259, and polyalkylene succinimide dispersants as described in U.S. Pat. Nos. 5,851,965; 5,853,434; and 5,792,729.

In some embodiments, the additional dispersant may be derived from a polyalphaolefin (PAO) succinic anhydride, an olefin maleic anhydride copolymer. As an example, the additional dispersant may be described as a poly-PIBSA. In another embodiment, the additional dispersant may be derived from an anhydride which is grafted to an ethylene-propylene copolymer. Another additional dispersant may be a high molecular weight ester or half ester amide.

The additional dispersant, if present, can be used in an amount sufficient to provide up to about 10 wt %, based upon the final weight of the lubricating oil composition. Another amount of the dispersant that can be used may be about 0.1 wt % to about 10 wt %, or about 0.1 wt % to about 10 wt %, or about 3 wt % to about 8 wt %, or about 1 wt % to about 6 wt %, based upon the final weight of the lubricating oil composition.

Molybdenum-Containing Compounds

The lubricating oil compositions herein also may optionally contain one or more molybdenum-containing compounds. An oil-soluble molybdenum compound may have the functional performance of an antiwear agent, an antioxidant, a friction modifier, or mixtures thereof.

Exemplary molybdenum-containing components may include molybdenum dithiocarbamates, molybdenum dialkyldithio phosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclearorgano-molybdenum compound, and/or mixtures thereof. Alternatively, an oil-soluble molybdenum compound may include molybdenum dithiocarbamates, molybdenum dialkyldithiophosphates, molybdenum dithiophosphinates, amine salts of molybdenum compounds, molybdenum xanthates, molybdenum thioxanthates, molybdenum sulfides, molybdenum carboxylates, molybdenum alkoxides, a trinuclear organo-molybdenum compound, and/or mixtures thereof. The molybdenum sulfides include molybdenum disulfide. The molybdenum disulfide may be in the form of a stable dispersion. In one embodiment the oil-soluble molybdenum compound may be selected from the group consisting of molybdenum dithiocarbamates, molybdenum dialkyldithiophosphates, amine salts of molybdenum compounds, and mixtures thereof. In one embodiment the oil-soluble molybdenum compound may be a molybdenum dithiocarbamate.

Suitable examples of molybdenum compounds which may be used include commercial materials sold under the trade names such as Molyvan® 822, Molyvan® A, Molyvan® 2000 and Molyvan® 855 from R. T. Vanderbilt Co., Ltd., and Sakura-Lube™ S-165, S-200, S-300, S-310G, S-525, S-600, S-700, and S-710 available from Adeka Corporation, and mixtures thereof. Suitable molybdenum components are described in U.S. Pat. No. 5,650,381; U.S. Pat. No. RE 37,363 E1; U.S. Pat. No. RE 38,929 E1; and U.S. Pat. No. RE 40,595 E1, incorporated herein by reference in their entireties.

Additionally, the molybdenum compound may be an acidic molybdenum compound. Included are molybdic acid, ammonium molybdate, sodium molybdate, potassium molybdate, and other alkaline metal molybdates and other molybdenum salts, e.g., hydrogen sodium molybdate, $MoOCl_4$, $MoO_2Br_2$, $Mo_2O_3Cl_6$, molybdenum trioxide or similar acidic molybdenum compounds. Alternatively, the compositions can be provided with molybdenum by molybdenum/sulfur complexes of basic nitrogen compounds as described, for example, in U.S. Pat. Nos. 4,263,152; 4,285,822; 4,283,295; 4,272,387; 4,265,773; 4,261,843; 4,259,195 and 4,259,194; and WO 94/06897, incorporated herein by reference in their entireties.

Another class of suitable organo-molybdenum compounds are trinuclear molybdenum compounds, such as those of the formula $Mo_3S_kL_nQ_z$ and mixtures thereof, wherein S represents sulfur, L represents independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms may be present among all the ligands' organo groups, such as at least 25, at least 30, or at least 35 carbon atoms. Additional suitable molybdenum compounds are described in U.S. Pat. No. 6,723,685, herein incorporated by reference in its entirety.

The oil-soluble molybdenum compound may be present in an amount sufficient to provide about 0.5 ppm to about 2000 ppm, about 1 ppm to about 700 ppm, about 1 ppm to about 550 ppm, about 5 ppm to about 300 ppm, or about 20 ppm to about 250 ppm of molybdenum.

Transition Metal-Containing Compounds

The lubricant compositions herein also may optionally contain a transition metal-containing compound or a metalloid. The transition metals may include, but are not limited to, titanium, vanadium, copper, zinc, zirconium, molybdenum, tantalum, tungsten, and the like. Suitable metalloids include, but are not limited to, boron, silicon, antimony, tellurium, and the like.

In an embodiment, a transition metal-containing compound may function as an antiwear agent, friction modifier, antioxidant, deposit control additive, or have multiple functions. In an embodiment transition metal-containing compound may be an oil-soluble titanium compound, such as a titanium (IV) alkoxide. Among the titanium containing compounds that may be used in, or which may be used for preparation of the oils-soluble materials of, the disclosed technology are various Ti (IV) compounds such as titanium (IV) oxide; titanium (IV) sulfide; titanium (IV) nitrate; titanium (IV) alkoxides such as titanium methoxide, titanium ethoxide, titanium propoxide, titanium isopropoxide, titanium butoxide, titanium 2-ethylhexoxide; and other titanium compounds or complexes including but not limited to titanium phenates; titanium carboxylates such as titanium (IV) 2-ethyl-1-3-hexanedioate or titanium citrate or titanium oleate; and titanium (IV) (triethanolaminato)isopropoxide. Other forms of titanium encompassed within the disclosed technology include titanium phosphates such as titanium dithiophosphates (e.g., dialkyldithiophosphates) and titanium sulfonates (e.g., alkylbenzenesulfonates), or, generally, the reaction product of titanium compounds with various acid materials to form salts, such as oil-soluble salts. Titanium compounds can thus be derived from, among others, organic acids, alcohols, and glycols. Ti compounds may also exist in dimeric or oligomeric form, containing Ti—O—Ti structures. Such titanium materials are commercially available or can be readily prepared by appropriate synthesis techniques which will be apparent to the person skilled in the art. They may exist at room temperature as a solid or a liquid, depending on the particular compound. They may also be provided in a solution form in an appropriate inert solvent.

In one embodiment, the titanium can be supplied as a Ti-modified dispersant, such as a succinimide dispersant. Such materials may be prepared by forming a titanium mixed anhydride between a titanium alkoxide and a hydrocarbyl-substituted succinic anhydride, such as an alkenyl- (or alkyl) succinic anhydride. The resulting titanate-succinate intermediate may be used directly or it may be reacted with any of a number of materials, such as (a) a polyamine-based succinimide/amide dispersant having free, condensable —NH functionality; (b) the components of a polyamine-based succinimide/amide dispersant, i.e., an alkenyl- (or alkyl-) succinic anhydride and a polyamine, (c) a hydroxy-containing polyester dispersant prepared by the reaction of a substituted succinic anhydride with a polyol, aminoalcohol, polyamine, or mixtures thereof. Alternatively, the titanate-succinate intermediate may be reacted with other agents such as alcohols, aminoalcohols, ether alcohols, polyether alcohols or polyols, or fatty acids, and the product thereof either used directly to impart Ti to a lubricant, or else further reacted with the succinic dispersants as described above. As an example, tetraisopropyl titanate may be reacted with polyisobutene-substituted succinic anhydride at 140-150° C. for 5 to 6 hours to provide a titanium modified dispersant or intermediate. The resulting material may be further reacted with a succinimide dispersant from polyisobutene-substituted succinic anhydride and a polyethylene polyamine to produce a titanium-modified succinimide dispersant.

Another titanium containing compound may be a reaction product of titanium alkoxide and $C_6$ to $C_{25}$ carboxylic acid. The reaction product may be represented by the following formula:

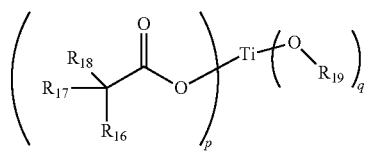

(Formula IX)

wherein p+q=4; q ranges from 1 to 3; $R_{19}$ is an alkyl moiety with carbon atoms ranging from 1-8; $R_{16}$ is selected from a hydrocarbyl group containing from about 6 to 25 carbon atoms; $R_{17}$, and $R_{18}$ are the same or different and are selected from a hydrocarbyl group containing from about 1 to 6 carbon atoms; or by the formula:

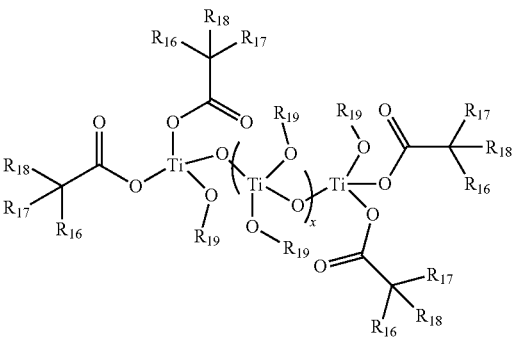

(Formula X)

wherein in Formula X, x ranges from 0 to 3; $R_{16}$ is selected from a hydrocarbyl group containing from about 6 to 25 carbon atoms. $R_{17}$, and $R_{18}$ are the same or different and are selected from a hydrocarbyl group containing from about 1 to 6 carbon atoms; and/or $R_{19}$ is selected from a group consisting of either H, or $C_6$ to $C_{25}$ carboxylic acid moiety. Suitable carboxylic acids may include, but are not limited to caproic acid, caprylic acid, lauric acid, myristic acid, palmitic acid, stearic acid, arachidic acid, oleic acid, erucic acid, linoleic acid, linolenic acid, cyclohexanecarboxylic acid, phenylacetic acid, benzoic acid, neodecanoic acid, and the like.

In an embodiment the oil soluble titanium compound may be present in the lubricating oil composition in an amount to provide from 0 to 3000 ppm titanium by weight or 25 to about 1500 ppm titanium by weight or about 35 ppm to 500 ppm titanium by weight or about 50 ppm to about 300 ppm.

Viscosity Index Improvers

The lubricant compositions herein also may optionally contain one or more other viscosity index improvers. Suitable other viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, polymethacrylates, polyacrylates, polyalkyl styrenes, hydrogenated alkenyl aryl conjugated diene copolymers, or mixtures thereof. Other viscosity index improvers may include star polymers and suitable examples are described in US Publication No. 20120101017A1, which is incorporated herein by reference.

The lubricating oil compositions herein also may optionally contain one or more other dispersant viscosity index improvers in addition to a viscosity index improver or in lieu of a viscosity index improver. Suitable viscosity index improvers may include functionalized polyolefins, for example, ethylene-propylene copolymers that have been functionalized with the reaction product of an acylating agent (such as maleic anhydride) and an amine; polymethacrylates functionalized with an amine, or esterified maleic anhydride-styrene copolymers reacted with an amine.

The total amount of other viscosity index improver and/or dispersant viscosity index improver may be about 0 wt % to about 20 wt %, about 0.1 wt % to about 15 wt %, about 0.1 wt % to about 12 wt %, or about 0.5 wt % to about 10 wt %, about 3 wt % to about 20 wt %, about 3 wt % to about 15 wt %, about 5 wt % to about 15 wt %, or about 5 wt % to about 10 wt %, of the lubricating oil composition.

In some embodiments, the other viscosity index improver is a polyolefin or olefin copolymer having a number average molecular weight of about 10,000 to about 500,000, about 50,000 to about 200,000, or about 50,000 to about 150,000. In some embodiments, the viscosity index improver is a hydrogenated styrene/butadiene copolymer having a number average molecular weight of about 40,000 to about 500,000, about 50,000 to about 200,000, or about 50,000 to about 150,000. In some embodiments, the viscosity index improver is a polymethacrylate having a number average molecular weight of about 10,000 to about 500,000, about 50,000 to about 200,000, or about 50,000 to about 150,000.

Other Optional Additives

Other additives may be selected to perform one or more functions required of lubricant composition. Further, one or more of the mentioned additives may be multi-functional and provide functions in addition to or other than the function prescribed herein. The other additives may be in addition to specified additives of the present disclosure and/or may comprise one or more of metal deactivators, viscosity index improvers, detergents, ashless TBN boosters, friction modifiers, antiwear agents, corrosion inhibitors, rust inhibitors, dispersants, dispersant viscosity index improvers, extreme pressure agents, antioxidants, foam inhibitors, demulsifiers, emulsifiers, pour point depressants, seal swelling agents and mixtures thereof. Typically, fully-formulated lubricating oil will contain one or more of these additives.

Suitable metal deactivators may include derivates of benzotriazoles (typically tolyltriazole), dimercaptothiadiazole derivatives, 1,2,4-triazoles, benzimidazoles, 2-alkyldithiobenzimidazoles, or 2-alkyldithiobenzothiazoles; foam inhibitors including copolymers of ethyl acrylate and 2-ethylhexylacrylate and optionally vinyl acetate; demulsifiers including trialkyl phosphates, polyethylene glycols, polyethylene oxides, polypropylene oxides and (ethylene oxide-propylene oxide) polymers; pour point depressants including esters of maleic anhydride-styrene, polymethacrylates, polyacrylates or polyacrylamides.

Suitable foam inhibitors include silicon-based compounds, such as siloxane.

Suitable pour point depressants may include a polymethylmethacrylates or mixtures thereof. Pour point depressants may be present in an amount sufficient to provide from about 0 wt % to about 1 wt %, about 0.01 wt % to about 0.5 wt %, or about 0.02 wt % to about 0.04 wt % based upon the final weight of the lubricating oil composition.

Suitable rust inhibitors may be a single compound or a mixture of compounds having the property of inhibiting corrosion of ferrous metal surfaces. Non-limiting examples of rust inhibitors useful herein include oil-soluble high molecular weight organic acids, such as 2-ethylhexanoic acid, lauric acid, myristic acid, palmitic acid, oleic acid, linoleic acid, linolenic acid, behenic acid, and cerotic acid, as well as oil-soluble polycarboxylic acids including dimer and trimer acids, such as those produced from tall oil fatty acids, oleic acid, and linoleic acid. Other suitable corrosion inhibitors include long-chain alpha, omega-dicarboxylic acids in the molecular weight range of about 600 to about 3000 and alkenylsuccinic acids in which the alkenyl group contains about 10 or more carbon atoms such as, tetrapropenylsuccinic acid, tetradecenylsuccinic acid, and hexadecenylsuccinic acid. Another useful type of acidic corrosion inhibitors are the half esters of alkenyl succinic acids having about 8 to about 24 carbon atoms in the alkenyl group with alcohols such as the polyglycols. The corresponding half amides of such alkenyl succinic acids are also useful. A useful rust inhibitor is a high molecular weight organic acid. In some embodiments, an engine oil is devoid of a rust inhibitor.

The rust inhibitor, if present, can be used in an amount sufficient to provide about 0 wt % to about 5 wt %, about 0.01 wt % to about 3 wt %, about 0.1 wt % to about 2 wt %, based upon the final weight of the lubricating oil composition.

The lubricant composition may also include corrosion inhibitors (it should be noted that some of the other mentioned components may also have copper corrosion inhibition properties). Suitable inhibitors of copper corrosion include ether amines, polyethoxylated compounds such as ethoxylated amines and ethoxylated alcohols, imidazolines, monoalkyl and dialkyl thiadiazole, and the like.

Thiazoles, triazoles and thiadiazoles may also be used in the lubricants. Examples include benzotriazole, tolyltriazole, octyltriazole, decyltriazole; dodecyltriazole, 2-mercaptobenzothiazole, 2,5-dimercapto-1,3,4-thiadiazole, 2-mercapto-5-hydrocarbylthio-1,3,4-thiadiazoles, and 2-mercapto-5-hydrocarbyldithio-1,3,4-thiadiazoles. In one embodiment, the lubricant composition includes a 1,3,4-thiadiazole, such as 2-hydrocarbyldithio-5-mercapto-1,3,4-dithiadiazole.

Anti-foam/Surfactant agents may also be included in a fluid according to the present invention. Various agents are known for such use. Copolymers of ethyl acrylate and hexyl ethyl acrylate, such as PC-1244, available from Solutia may be used. In other embodiments, silicone fluids, such as 4% DCF may be included. Mixtures of anti-foam agents may also be present in the lubricant composition.

A suitable engine lubricant may include additive components in the ranges listed in Table 2 with broad and narrower ranges. Base oil makes up the balance of the lubricant.

TABLE 2

| Component | Wt % (Suitable Embodiments) | Wt % (Preferred Embodiments) |
|---|---|---|
| Novel Capped Dispersant | 0.1 to 10 | 0.3 to 2 |
| Antioxidant(s) | 0.1-5.0 | 0.01-4.0 |
| Detergent(s) | 0.0-15.0 | 1.0-8.0 |
| Ashless TBN booster(s) | 0.0-1.0 | 0.01-0.5 |
| Corrosion inhibitor(s) | 0.0-5.0 | 0.1-3.0 |
| Metal dihydrocarbyl dithiophosphate(s) | 0.0- 5.0 | 0.1-5.0 |
| Ash-free phosphorus compound(s) | 0.0-15.0 | 0.1-5.0 |
| Antifoaming agent(s) | 0.0-1.0 | 0.001-0.5 |
| Other Antiwear agent(s) | 0.0-1.0 | 0.0-0.8 |
| Pour point depressant(s) | 0.0-1.0 | 0.01-0.5 |
| Viscosity index improver(s) | 0.0-20.0 | 0.1-10.0 |
| Other Dispersants | 0.0-10.0 | 1.0-6.0 |
| Dispersant viscosity index improver(s) | 0.0-10.0 | 0.0-5.0 |
| Friction modifier(s) | 0.0-10.0 | 0.01-4.0 |
| Extreme Pressure Agent (S wt %) | 0.0-1.05 | 0.035-.35 |
| Base oil(s) | Balance | Balance |
| Total | 100 | 100 |

The percentages of each component above represent the weight percent of each component, based upon the weight of the total final lubricating oil composition. The balance of the lubricating oil composition consists of one or more base oils. Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent).

Fully formulated lubricants conventionally contain an additive package, often referred to as a dispersant/inhibitor package or DI package, which will supply the characteristics that are required in the formulations. Suitable DI packages are described for example in U.S. Pat. Nos. 5,204,012 and 6,034,040 for example. Among the types of additives included in the additive package may be dispersants, seal swell agents, antioxidants, foam inhibitors, lubricity agents, rust inhibitors, corrosion inhibitors, demulsifiers, viscosity index improvers, and the like. Several of these components are well known to those skilled in the art and are generally used in conventional amounts with the additives and compositions described herein.

Additives used in formulating the compositions described herein may be blended into the base oil individually or in various sub-combinations. However, it may be suitable to blend all of the components concurrently using an additive concentrate (i.e., additives plus a diluent, such as a hydrocarbon solvent). The use of an additive concentrate may take advantage of the mutual compatibility afforded by the combination of ingredients when in the form of an additive concentrate. Also, the use of a concentrate may reduce blending time and may lessen the possibility of blending errors.

In further embodiments, the invention relates to a method for lubricating an engine by lubricating an engine with a lubricant composition of any of the forgoing embodiments. In yet a further embodiment, the invention relates to the use of a lubricant composition according to any of the forgoing embodiments to lubricate an engine and/or use of lubricant composition to achieve reduced friction coefficients and/or improved seal compatibility as demonstrated in the tables below.

Lubricants, combinations of components, or individual components of the present description may be suitable for use as a lubricant in various types of internal combustion engines. Suitable engine types may include, but are not limited to, heavy duty diesel, passenger car, light duty diesel, medium speed diesel, or marine engines. An internal combustion engine may be a diesel fueled engine, a gasoline fueled engine, a natural gas fueled engine, a bio-fueled engine, a mixed diesel/biofuel fueled engine, a mixed gasoline/biofuel fueled engine, an alcohol fueled engine, a mixed gasoline/alcohol fueled engine, a compressed natural gas (CNG) fueled engine, or mixtures thereof. A diesel engine may be a compression ignited engine. A gasoline engine may be a spark-ignited engine. An internal combustion engine may also be used in combination with an electrical or battery source of power. An engine so configured is commonly known as a hybrid engine. The internal combustion engine may be a 2-stroke, 4-stroke, or rotary engine. Suitable internal combustion engines include marine diesel engines (such as inland marine), aviation piston engines, low-load diesel engines, and motorcycle, automobile, locomotive, and truck engines.

The lubricating oil composition for an internal combustion engine may be suitable for any engine lubricant irrespective of the sulfur, phosphorus, or sulfated ash (ASTM D-874) content. In some approaches, the sulfur content of the engine oil lubricants herein may be about 1 wt % or less, or about 0.8 wt % or less, or about 0.5 wt % or less, or about 0.3 wt % or less, or about 0.2 wt % or less. In one embodiment the sulfur content may be in the range of about 0.001 wt % to about 0.5 wt %, or about 0.01 wt % to about 0.3 wt %. The phosphorus content of the engine oil lubricants herein may be about 0.2 wt % or less, or about 0.1 wt % or less, or about 0.085 wt % or less, or about 0.08 wt % or less, or even about 0.06 wt % or less, about 0.055 wt % or less, or about 0.05 wt % or less. In one embodiment the phosphorus content may be about 50 ppm to about 1000 ppm, or about 325 ppm to about 850 ppm, or up to 600 ppm. The total sulfated ash content of the engine oil lubricants herein may be about 2 wt % or less, or about 1.5 wt % or less, or about 1.1 wt % or less, or about 1 wt % or less, or about 0.8 wt % or less, or about 0.5 wt % or less. In one embodiment the sulfated ash content may be about 0.05 wt % to about 0.9 wt %, or about 0.1 wt % or about 0.2 wt % to about 0.45 wt %.

Further, lubricants of the present description may be suitable to meet one or more industry specification requirements such as ILSAC GF-3, GF-4, GF-5, GF-6, CK-4, FA-4, CJ-4, CI-4 Plus, CI-4, ACEA A1/B1, A2/B2, A3/B3, A3/B4, A5/B5, C1, C2, C3, C4, C5, E4/E6/E7/E9, Euro 5/6, JASO DL-1, Low SAPS, Mid SAPS, or original equipment manufacturer specifications such as Dexos™ 1, Dexos™ 2, MB-Approval 229.51/229.31, VW 502.00, 503.00/503.01, 504.00, 505.00, 506.00/506.01, 507.00, 508.00, 509.00, BMW Longlife-04, Porsche C30, Peugeot Citroën Automobiles B71 2290, B71 2296, B71 2297, B71 2300, B71 2302, B71 2312, B71 2007, B71 2008, Ford WSS-M2C153-H, WSS-M2C930-A, WSS-M2C945-A, WSS-M2C913A, WSS-M2C913-B, WSS-M2C913-C, GM 6094-M, Chrysler MS-6395, or any past or future passenger car motor oil or heavy duty diesel oil specifications not mentioned herein. In some embodiments for passenger car motor oil applications, the amount of phosphorus in the finished fluid is 1000 ppm or less or 900 ppm or less or 800 ppm or less or 600 ppm or less. In some embodiments for heavy duty diesel applications, the amount of phosphorus in the finished fluid is 1200 ppm or less or 1000 ppm or less or 900 ppm or less or 800 ppm or less.

In certain applications, the lubricants of the present disclosure may also be suitable for automatic transmission fluids, continuously variable transmission fluids, manual transmission fluids, gear oils, other fluids related to power train components, off-road fluids, power steering fluids, fluids used in wind turbines, compressors, hydraulic fluids, slideway fluids, and other industrial fluids. In certain applications, these lubricating applications may include lubrication of gearboxes, power take-off and clutch(es), rear axles, reduction gears, wet brakes, and hydraulic accessories.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise or apparent from the context of discussion in the Examples below and throughout this disclosure, all percentages, ratios, and parts noted in this disclosure are by weight. Unless otherwise described, exemplary reactions described herein and throughout this disclosure were generally performed in a 500 mL flask with overhead stirring, a water removal condenser, temperature probe, and nitrogen supply. When necessary, the reactions were heated using an isomantle.

EXAMPLES

The following examples are illustrative, but not limiting, of the methods and compositions of the present disclosure. Other suitable modifications and adaptations of the variety of conditions and parameters normally encountered in the field, and which are obvious to those skilled in the art, are within the spirit and scope of the disclosure. Unless otherwise noted by the context of the disclosure, all percentages, ratios, amounts, and parts are by weight. When used in the tables below, and throughout the text, elemental concentrations, such as ppm phosphorus or ppm nitrogen, are measured using standard inductively coupled plasma (ICP) spectroscopy techniques.

Comparative and inventive dispersants were evaluated in the following Examples for dispersancy and friction performance:

Comparative Dispersant CE-1: A hydrocarbyl-substituted succinimide obtained from reacting polyisobutylene (PIB) succinic anhydride (PIBSA) having a 2300 number average molecular weight PIB substituent with tetraethylene pentamine (TEPA).

Comparative Dispersant (CE-2): Comparative dispersant CE-2 was obtained by post-treating comparative dispersant CE-1 with 1 molar equivalent of maleic anhydride.

Comparative Dispersant (CE-3): Comparative dispersant CE-3 was obtained by post-treating comparative dispersant CE-1 with 3 molar equivalents of maleic anhydride.

Comparative Dispersant (CE-4): A hydrocarbyl-substituted succinimide obtained from reacting polyisobutylene succinic anhydride (PIBSA) having a 1300 number average molecular weight with amine bottoms which was then post-treated with 1 molar equivalent of maleic anhydride.

Comparative Dispersant (CE-5): A hydrocarbyl-substituted succinimide obtained from reacting polyisobutylene succinic anhydride (PIBSA) having a 1300 number average molecular weight with amine bottoms which was then post-treated with 3 molar equivalent of maleic anhydride.

Inventive Dispersant I-1: Inventive Dispersant I-1 was obtained by post-treating Comparative Dispersant CE-1 with 2-ethyl-2-oxazoline using the following procedure: about 263.63 g of dispersant CE-1 was heated to about 95° C. under active nitrogen flow using a constant stir rate of about 300 rpm. Once this temperature was reached, about 36.37 grams (about 0.36 moles) of 2-ethyl-2-oxazoline was added a few aliquots at a time. The reaction mixture was then allowed to react for about 6 hours at about 130° C. and a constant stir rate of 300 rpm. The reaction was filtered.

Inventive Dispersant 1-2: Inventive Dispersant 1-2 was obtained by post treating Comparative Dispersant CE-1 with 2-phenyl-2-oxazoline using the following procedure: about 246.03 g of dispersant CE-1 was heated to about 95° C. under an active nitrogen flow using a constant stir rate of 300 rpm. Once this temperature was reached, about 54 grams of (about 0.36 moles) of 2-phenyl-2-oxazoline was added a few aliquots at a time. The reaction mixture was allowed to react for about 6 hours at about 95° C. and a constant stir rate of about 300 rpm. The reaction was filtered.

Inventive Dispersants I-3 and I-5: Inventive dispersants I-3 and I-5 were obtained by post-treating Comparative Dispersant CE-1 with 1 molar equivalent (I-3) and 3 molar equivalents (I-5) of 2-ethyl-2-oxazoline using a procedure consistent to that used to prepare Inventive Dispersant I-1.

Inventive Dispersants I-4 and I-6: Inventive dispersants I-4 and I-6 were obtained by post-treating Comparative Dispersant CE-1 with 1 molar equivalent (I-4) and 3 molar equivalents (I-6) of 2-phenyl-2-oxazoline using a procedure consistent to that used to prepare Inventive Dispersant 1-2.

Inventive Dispersants I-7 and I-9: Inventive dispersants I-7 and I-9 were obtained by post treating the Comparative Dispersant CE-4 with either 1 molar equivalent (I-7) and 3 molar equivalents (I-9) of 2-ethyl-2-oxazoline using a procedure consistent to that used to prepare dispersant CE-4.

Inventive Dispersants I-8 and I-10: Inventive dispersants I-8 and I-10 were obtained by post-treating Comparative Dispersant CE-4 with either 1 molar equivalent (I-8) and 3 molar equivalents (I-10) of 2-phenyl-2-oxazoline using a procedure consistent to that used to prepare dispersant CE-4.

Two exemplary post-treatment reaction schemes of a polyisobutylene (PIB) dispersant obtained from reacting a PIB succinic anhydride (PIBSA) with tetraethylene pentamine (TEPA) and then post treating with 2-ethyl-2-oxazxoline are provided below:

Reaction: Scheme (I) -
each R being individually a hydrogen or the oxazoline reaction moiety

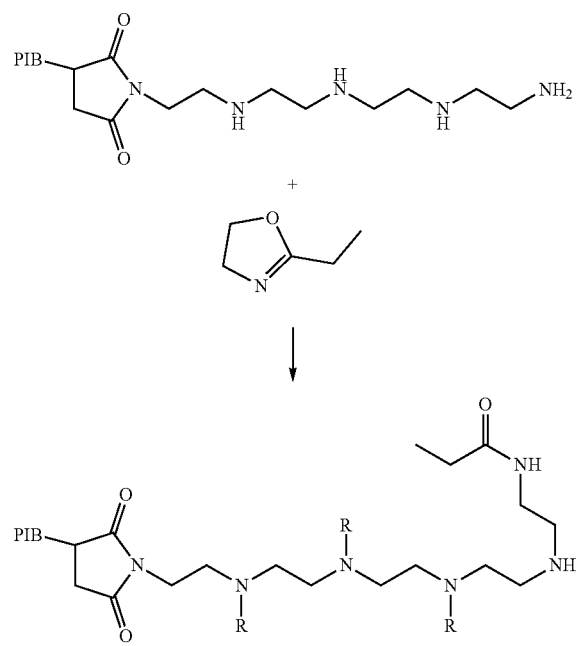

Reaction Scheme (II)

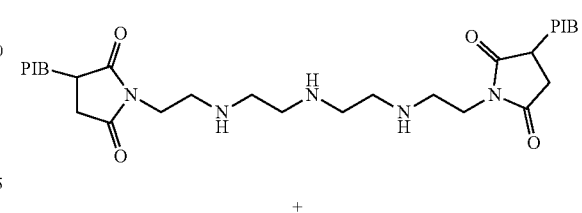

+

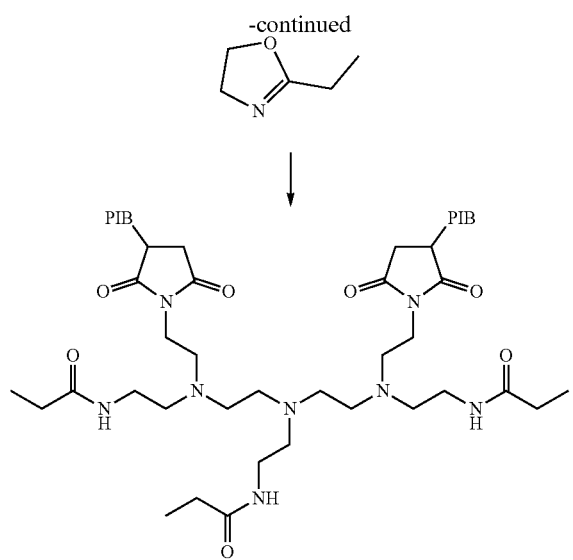

In another example, a third exemplary post-treatment reaction scheme of a polyisobutylene (PIB) dispersant obtained from reacting a PIB succinic anhydride (PIMA) with tetraethylene pentamine (TEPA) and then post treating with 2-phenyl-2-oxazoline is provided below:

Reaction Scheme (III)

It will be appreciated that similar reaction schemes are contemplated within this disclosure using the other dispersants, dispersant viscosity modifiers, and other oxazoline or oxazoline derivatives consistent with all discussions herein. Additionally, the PIB hydrocarbyl groups in the above reaction schemes may also be other olefins or olefin copolymers as described in this disclosure.

Example 1

Comparative and inventive dispersants were first evaluated for dispersant performance using an Anton Parr Rheometer to determine rheological profiles and the minimum amount of dispersant to completely disperse soot as evidenced by a rheological profile that is flat or Newtonian. This minimum amount of dispersant is identified as the effective concentration (EC). A lower effective concentration indicates a better dispersant.

Without dispersant, an oil containing soot particles typically has a shear thinning (non-Newtonian) behavior where viscosity decreases with increasing shear rate due to the agglomeration of soot particles at low shear rate resulting in high viscosity, while at higher shear rate, soot particle agglomeration was broken up resulting in low viscosity. If an additive with dispersant capability is added to a sooted oil, the soot particles are protected by the dispersant without agglomeration, thus the oil has an ideally viscous or Newtonian fluid behavior where viscosity is independent of shear rate. (See, e.g., Thomas G. Mezger, The Rheology Handbook, 3rd Revised Edition, 2011, portions thereof are incorporated herein by reference.) Based on this, a dispersancy test was designed to test effectiveness of the comparative and inventive dispersants to disperse soot particles using a Physica MCR 301 Rheometer (Anton Parr). In this test, a sooted oil having about 4.6 weight percent soot was generated from a fired diesel engine using a fluid that contains no dispersants. The sooted oil was then top treated with a certain amount of inventive and comparative dispersants and then tested by a shear rate sweep in a rheometer with a parallel plate to look for Newtonian/non-Newtonian behavior. The test temperature was about 100° C. and the test top plate was an Anton Parr CP50-1 plate. A profile of viscosity and shear rate was recorded, and the results may be seen, for instance, in the graph of FIG. 1 showing dispersant performance at 0.665 weight percent dispersant in the lubricating oil.

The effective concentration is the concentration of the tested dispersant in the lubricating oil that is sufficient to obtain Newtonian fluid behavior for the lubricant composition. A Newtonian fluid is obtained when the slope of the viscosity versus shear rate curve is equal to zero. The concentration of the disperant at which the slope is zero is the effective concentration (EC) for that dispersant.

The lubricant compositions used in the following Examples were prepared using samples of the same sooted oil as prepared above. A single dispersant or an additive composition was then added in varying concentrations to the sooted oil. Additional components present in each of the formulations evaluated in this Example included: antioxidant(s); detergent(s); ashless TBN booster(s); corrosion inhibitor(s); metal dihydrocarbyldithiophosphate(s); ash-free phosphorus compound(s); antifoaming agent(s); anti-wear agent(s); pour point depressant(s); and friction modifier(s). The amount of sooted oil was varied to provide the balance of the composition to account for the variations in the amount of the dispersants, or additive compositions used in each lubricant composition. The amounts of all of the other additives in the lubricant composition were held constant.

Each lubricant composition was then subjected to a shear rate sweep in a rheometer with a cone on plate to determine Newtonian/non-Newtonian behavior and, to measure the effective concentrations of the dispersants or additive compositions at which Newtonian behavior was observed. All tests were performed at the same constant termperature of 100° C. Several concentrations of dispersant were tested for each lubricant composition. The slope of each curve was calculated. The effective concentration of the dispersant was deemed to be the concentration of the dispersant in the lubricant, at which the lubricant composition exhibited Newtonian behavior. The effective concentration was thus the concentration of dispersant that provided a lubricant composition that exhibited no change in viscosity with shear rate over time. As noted above, this was determined by finding the concentration of dispersant at which the slope of the curve for the viscosity versus shear rate was zero.

Effective concetnration or EC of the tested dispersants is shown in Table 3 below. The actual amount of dispersant used in a lubricants may be higher depending on other properties desired for the lubricant.

TABLE 3

Effective Concentration

| Dispersant ID | Capping Agent | Dispersant Effective Concentration (EC) |
|---|---|---|
| CE-1 | None | 1.1 |
| I-1 | 2-ethyl-2-oxazoline | 0.91 |
| I-2 | 2-phenyl-2-oxazoline | 2.01 |
| CE-2 | Maleic Anhydride | 1.24 |
| I-3 | 2-ethyl-2-oxazoline | 0.83 |
| I-4 | 2-phenyl-2-oxazoline | 0.81 |
| CE-3 | Maleic Anhydride | 5.2 |
| I-5 | 2-ethyl-2-oxazoline | 0.85 |
| I-6 | 2-phenyl-2-oxazoline | 0.9 |
| CE-4 | Maleic Anhydride | 1.5 |
| I-7 | 2-ethyl-2-oxazoline | 1.53 |
| I-8 | 2-phenyl-2-oxazoline | 1.5 |
| CE-5 | Maleic Anhydride | 2.83 |
| I-9 | 2-ethyl-2-oxazoline | 1.35 |
| I-10 | 2-phenyl-2-oxazoline | 1.1 |

As shown in Table 3 above, the inventive dispersant I-1, for instance, exhibited improved dispersancy as compared to the uncapped version in CE-1. The effective or minimum concentration to disperse soot of inventive dispersant I-1 was about 11.8 percent lower than the uncapped version of the dispersant. In the other evaluations, each of the inventive dispersants demonstrated an equal or lower EC than the comparative samples utilizing the comparative maleic anhydride capping agent.

In FIG. 1, exemplary rheology curves of dispersants I-1, 1-2, and CE-1 are shown compared to a untreated sooted oil. The curve labeled "Sooted Oil" represented the viscosity versus shear rate curve of an oil having about 4.6 weight percent soot (as discussed above) and before addition of any dispersants. The sooted oil exhibited a shear thinning behavior, which was believed to be due to the soot particles agglomerated together. Next, the same sooted oil was evaluated with various amounts of the capped and uncapped PIB dispersants. The amounts of PIB dispersant used in each rheology evaluation ranged between 0.665 and 1.964 weight percent (solids) to determine the effective concentration shown in Table 3. FIG. 1 shows rheology curves at the initial 0.665% treat rate. The Inventive PIB dispersant I-1 was the 2-ethyl-2-oxazoline capped versions of uncapped Comparative Example CE-1 and exhibited relatively lower viscosity versus shear rate at the initial 0.665 weight percent treat rates shown in FIG. 1, which indicates a better dispersing ability than comparative example CE-1. As seen in FIG. 1, the viscosity curve for Inventive Dispersant I-1 at low shear is lower than the curve for Comparative Example CE-1 (uncapped version of same dispersant). These results demonstrate that the Inventive dispersant I-1 was the most effective at dispersing soot particles at the treat rate used in this Example.

Example 2

The comparative and inventive dispersants CE-1, I-1, and I-2 were also subjected to friction testing using a High Frequency Reciprocating Rig (HFRR) test. A HFRR test apparatus from PCS Instruments was used to measure the boundary lubrication regime friction coefficients. For this testing, the test samples are measured by submerging the contact between an SAE 52100 metal ball and an SAE 52100 metal disk in a temperature controlled bath under a fixed load forwards and backwards at a set stroke frequency. The friction coefficients of the tested samples at a treat rate of about 0.1 weight percent of dispersant in 3 weight percent base oil were measured at about 130° C. and the friction coefficient, temperature, and electrical contact resistance were monitored throughout the test. The ability of the lubricant to reduce boundary layer friction is reflected by the determined boundary lubrication regime friction coefficients. A lower value is indicative of lower friction. Results are provided in Table 4 below comparing an uncapped dispersant to inventive, capped dispersants.

TABLE 4

HFRR Data of uncapped and capped dispersants

| Dispersant | Treat Rate | HFRR 130° C. |
|---|---|---|
| Standard | — | 0.147 |
| I - 1 | 0.1 | 0.148 |
| I - 2 | 0.1 | 0.153 |
| CE - 1 | 0.1 | 0.155 |

Comparative Dispersants CE-2 through CE-5 and Inventive Dispersants I-3 through I-10 were also subjected to friction testing using the High Frequency Reciprocating Rig (HFRR) test in order to evaluate the boundary friction regime of the lubricants. In these investigations, a comparative nitrogen capping agent from maleic anhydride was compared to inventive nitrogen capping agents derived from oxazolines. Results are shown in Tables 5 and 6 below and FIG. 2 that illustrates the boundary friction coefficient by the type of capping agent.

TABLE 5

HFRR Data at 1 Molar Equivalent of Capping agent to active amines

| Sample ID | PIB MW | Treat Rate, wt % | MW Capping Agent | HFRR (1MR) |
|---|---|---|---|---|
| CE-2 | 2300 | 2 | 98 | 0.178 |
| I-3 | 2300 | 2 | 99 | 0.184 |
| I-4 | 2300 | 2 | 147 | 0.175 |
| CE-2 | 2300 | 6 | 98 | 0.177 |
| I-3 | 2300 | 6 | 99 | 0.176 |
| I-4 | 2300 | 6 | 147 | 0.170 |
| CE-4 | 1300 | 2 | 98 | 0.176 |
| I-7 | 1300 | 2 | 99 | 0.174 |
| I-8 | 1300 | 2 | 147 | 0.173 |
| CE-4 | 1300 | 6 | 98 | 0.174 |
| I-7 | 1300 | 6 | 99 | 0.172 |
| I-8 | 1300 | 6 | 147 | 0.171 |

TABLE 6

HFRR Data at 3 Molar Equivalents
of Capping Agent to Active Amine

| Sample ID | PIB MW | Treat Rate, wt % | MW Capping Agent | HFRR (3MR) |
|---|---|---|---|---|
| CE-3 | 2300 | 2 | 98 | 0.214 |
| I-5 | 2300 | 2 | 99 | 0.178 |
| I-6 | 2300 | 2 | 147 | 0.172 |
| CE-3 | 2300 | 6 | 98 | 0.193 |
| I-5 | 2300 | 6 | 99 | 0.172 |
| I-6 | 2300 | 6 | 147 | 0.177 |
| CE-5 | 1300 | 2 | 98 | 0.177 |
| I-9 | 1300 | 2 | 99 | 0.173 |
| I-10 | 1300 | 2 | 147 | 0.17 |
| CE-5 | 1300 | 6 | 98 | 0.173 |
| I-9 | 1300 | 6 | 99 | 0.174 |
| I-10 | 1300 | 6 | 147 | 0.18 |

As shown in FIG. 2, regardless of treat rate or molar equivalent ratios between the capping agent and the active amines, the inventive dispersants capped with oxazolines demonstrated a more robust and consistent boundary friction coefficient than similar PIBSA-amine dispersants capped with the comparative maleic anhydride. Thus, not only do the inventive dispersants provide good dispersancy, the inventive dispersants surprisingly have a more robust and consistent frictional performance relative to other capped dispersants because the boundary friction was less affected by the capping agent type, treat rate, or even molar equivalencies of the capping agent to the unprotected amines. It was unexpected that capping agent type would demonstrate such consistent and robust boundary frictional performance on top of its dispersancy performance.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed is:

1. A lubricant dispersant comprising:
a reaction product of a hydrocarbyl substituted succinamide or succinimide dispersant with an oxazoline or an oxazoline derivative to form the lubricant dispersant having one or more imide groups and one or more pendant hydrocarbyl amide groups;
wherein the hydrocarbyl substituted succinamide or succinimide dispersant is derived from a hydrocarbyl substituted acylating agent reacted with a polyalkylene polyamine; and
wherein the hydrocarbyl substituent of the succinamide or the succinimide dispersant is a linear or branched hydrocarbyl group having a number average molecular weight of about 250 to about 5,000 as measured by GPC using polystyrene as a calibration reference.

2. The lubricant dispersant of claim 1, wherein the oxazoline or the oxazoline derivative includes hydrocarbyl pendant groups in one of oxazoline ring positions 2, 4, 5, or combinations thereof.

3. The lubricant dispersant of claim 2, wherein the hydrocarbyl pendant groups are selected from C1 to C32 hydrocarbyl, substituted or unsubstituted aromatic, substituted or unsubstituted hetrocyclic aromatic, hydroxyalkyl, and mixtures thereof.

4. The lubricant dispersant of claim 1, wherein the oxazoline or the oxazoline derivative is selected from the group consisting of 2-ethyl-2-oxazoline; 2-methyl-2-oxazoline; 2-benzyl-4,4-dimethyl-2-oxazoline; 2-ethyl-4,4-dimethyl-2-oxazoline; 2,4,4-trimethyl-2-oxazoline; 4,4-dimethyl-2-oxazoline; 2-(2,6-dimethoxyphenyl)-4,4-dimethyl-2-oxazoline; 2-phenyl-2-oxazoline; 2-[1-(hydroxymethyl) ethyl]oxazoline; mixtures thereof, and derivatives thereof.

5. The lubricant dispersant of claim 1, wherein the acylating agent is selected from maleic anhydride, maleic acid, malic acid, tartaric acid, itaconic acid, itaconic anhydride, citraconic acid, citraconic anhydride, mesaconic acid, ethylmaleic anhydride, dimethylmaleic anhydride, methylmaleic acid, dimethylmaleic acid, hexylmaleic acid, and combinations thereof.

6. The lubricant dispersant of claim 1, wherein the one or more pendant hydrocarbyl amide groups extend from amine moieties provided by the polyalkylene polyamine.

7. The lubricant dispersant of claim 6, wherein the amine moieties are primary amine moieties, secondary amines moieties, or combinations thereof.

8. The lubricant dispersant of claim 6, further comprising a molar ratio of the oxazoline or the oxazoline derivative to the amine moieties provided from the polyalkylene polyamine reactant of about 0.33:1 to about 6:1 molar equivalents.

9. The lubricant dispersant of claim 1, wherein the hydrocarbyl substituent is derived from one or more of ethylene, propylene, isopropylene, butylene, isobutylene, octane, hexane, decene, pentylene, isopentylene, neopentylene, or combinations thereof.

10. The lubricant dispersant of claim 1, wherein the hydrocarbyl substituent is derived from an olefin copolymer.

11. The lubricant dispersant of claim 10, wherein the olefin copolymer is obtained from ethylene and one or more C3 to C10 alpha olefins.

12. The lubricant dispersant of claim 1, wherein the hydrocarbyl substituent of the succinamide or the succinimide is the linear or branched hydrocarbyl group having a number average molecular weight of about 250 to about 3,000 as measured by GPC using polystyrene as a calibration reference.

13. The lubricant dispersant of claim 12, wherein the polyalkylene polyamine has the formula

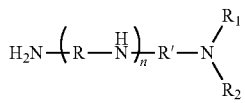

wherein
each R and R', independently, is a divalent C1 to C6 alkylene linker;
each $R_1$ and $R_2$, independently, is hydrogen, a C1 to C6 alkyl group, or together with the nitrogen atom to which they are attached form a 5- or 6-membered ring optionally fused with one or more aromatic or non-aromatic rings; and
n is an integer from 0 to 8.

14. The lubricant dispersant of claim 1, wherein the polyalkylene polyamine is selected from the group consisting of a mixture of polyethylene polyamines having an average of 5 to 7 nitrogen atoms, triethylenetetramine, tetraethylenepentaamine, and combinations thereof.

15. The lubricant dispersant of claim 1, wherein the reaction product is the hydrocarbyl-substituted succinimide and has a ratio of pendant amide groups to imide groups of about 0.5:1 to about 5:1.

16. A lubricant composition comprising:
a base oil of lubricating viscosity;
a dispersant derived from a hydrocarbyl substituted succinamide or succinimide reacted with an oxazoline or an oxazoline derivative, the dispersant having one or more imide groups and one or more pendant hydrocarbyl amide groups extending from amine moieties thereof;
wherein the hydrocarbyl substituted succinamide or succinimide is derived from a hydrocarbyl substituted succinic anhydride or acid reacted with a polyalkylene polyamine providing the one or more amine moieties; and
wherein the hydrocarbyl substituent of the succinamide or succinimide is a linear or branched hydrocarbyl group having a number average molecular weight of about 250 to about 5,000 as measured by GPC using polystyrene as a calibration reference.

17. The lubricant composition of claim 16, wherein the oxazoline or the oxazoline derivative includes hydrocarbyl pendant groups in one of oxazoline ring positions 2, 4, 5 or combinations thereof.

18. The lubricant composition of claim 17, wherein the hydrocarbyl pendant groups are selected from C1 to C32 hydrocarbyl, substituted or unsubstituted aromatic, substituted or unsubstituted hetrocyclic aromatic, hydroxyalkyl, and mixtures thereof.

19. The lubricant composition of claim 16, wherein the oxazoline or the oxazoline derivative is selected from the group consisting of 2-ethyl-2-oxazoline; 2-methyl-2-oxazoline; 2-benzyl-4,4-dimethyl-2-oxazoline; 2-ethyl-4,4-dimethyl-2-oxazoline; 2,4,4-trimethyl-2-oxazoline; 4,4-dimethyl-2-oxazoline; 2-(2,6-dimethoxyphenyl)-4,4-dimethyl-2-oxazoline; 2-phenyl-2-oxazoline; 2-[1-(hydroxymethyl)ethyl]oxazoline; mixtures thereof, and derivatives thereof.

20. The lubricant composition of claim 16, wherein the hydrocarbyl substituted succinic anhydride or acid is a hydrocarbyl-substituted maleic anhydride, maleic acid, malic acid, tartaric acid, itaconic acid, itaconic anhydride, citraconic acid, citraconic anhydride, mesaconic acid, ethylmaleic anhydride, dimethylmaleic anhydride, methylmaleic acid, dimethylmaleic acid, hexylmaleic acid, or combinations thereof.

21. The lubricant composition of claim 16, wherein the amine moieties provided by the polyalkylene polyamine are selected from one of primary amines, secondary amines, or combinations thereof.

22. The lubricant composition of claim 21, further comprising a molar ratio of the oxazoline or the oxazoline derivative to the amine moieties provided by the polyalkylene polyamine reactant of about 0.33:1 to about 6:1 molar equivalents.

23. The lubricant composition of claim 16, wherein the hydrocarbyl substituent is a linear or branched hydrocarbyl group having a number average molecular weight of about 250 to about 3,000 as measured by GPC using polystyrene as a calibration reference.

24. The lubricant composition of claim 23, wherein the polyalkylene polyamine has the formula

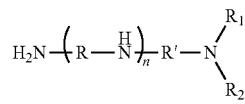

wherein
each R and R', independently, is a divalent C1 to C6 alkylene linker;
each $R_1$ and $R_2$, independently, is hydrogen, a C1 to C6 alkyl group, or together with the nitrogen atom to which they are attached form a 5- or 6-membered ring optionally fused with one or more aromatic or non-aromatic rings; and n is an integer from 0 to 8.

25. The lubricant composition of claim 16, wherein the polyalkylene polyamine is selected from the group consisting of a mixture of polyethylene polyamines having an average of 5 to 7 nitrogen atoms, triethylenetetramine, tetraethylenepentaamine, and combinations thereof.

26. The lubricant composition of claim 16, wherein the dispersant is the hydrocarbyl-substituted succinimide and has a ratio of pendant amide groups to imide groups of 0.5:1 to 5:1.

27. The lubricant composition of claim 16, wherein the hydrocarbyl substituent of the dispersant is derived from one or more of ethylene, propylene, isopropylene, butylene, isobutylene, octane, hexane, decene, pentylene, isopentylene, neopentylene, or combinations thereof.

28. The lubricant composition of claim 16, wherein the hydrocarbyl substituent of the dispersant is an olefin copolymer.

29. The lubricant composition of claim 28, wherein the olefin copolymer is obtained from ethylene and one or more C3 to C10 alpha olefins.

* * * * *